US011950089B2

United States Patent
Bharitkar et al.

(10) Patent No.: US 11,950,089 B2
(45) Date of Patent: Apr. 2, 2024

(54) PERCEPTUAL BASS EXTENSION WITH LOUDNESS MANAGEMENT AND ARTIFICIAL INTELLIGENCE (AI)

(71) Applicant: Samsung Electronics Co., Ltd., Suwon-si (KR)

(72) Inventors: Sunil Bharitkar, Stevenson Ranch, CA (US); William I. Saba, Santa Clarita, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 17/689,744

(22) Filed: Mar. 8, 2022

(65) Prior Publication Data

US 2023/0029841 A1 Feb. 2, 2023

Related U.S. Application Data

(60) Provisional application No. 63/226,951, filed on Jul. 29, 2021.

(51) Int. Cl.
*H04S 7/00* (2006.01)
*G06N 20/00* (2019.01)
(Continued)

(52) U.S. Cl.
CPC ............ *H04S 7/307* (2013.01); *G06N 20/00* (2019.01); *H04R 5/02* (2013.01); *H04R 5/04* (2013.01);
(Continued)

(58) Field of Classification Search
CPC ...... H04S 7/307; H04S 3/008; H04S 2400/01; H04S 2400/07; H04S 2400/13; G06N 20/00; H04R 5/02; H04R 5/04
See application file for complete search history.

(56) References Cited

U.S. PATENT DOCUMENTS 8,582,784 B2   11/2013   Minnaar
9,319,789 B1    4/2016   Nielsen
(Continued)

FOREIGN PATENT DOCUMENTS

CN        111796791 A        10/2020
WO    WO-2009044357 A2 *     4/2009   ............. H04S 7/307

OTHER PUBLICATIONS

International Search Report & Written Opinion dated Nov. 7, 2022 for International Application PCT/KR2022/011143 from the Korean IP Office, pp. 1-8, Republic of Korea.
(Continued)

*Primary Examiner* — Andrew L Sniezek
(74) *Attorney, Agent, or Firm* — Sherman IP LLP; Kenneth L. Sherman; Steven Laut

(57) ABSTRACT

One embodiment provides a computer-implemented method that includes implementing a customizable compressor for at least one sidechain processing associated with a loudspeaker. Machine learning is applied to automatically tune one or more parameters of the at least one sidechain processing. One or more channels are extracted, including a low-frequency effects (LFE) channel, for nonlinear signal synthesis. A proportional power-sum-based mix-in of an LFE sidechain channel is applied into a non-LFE sidechain. The LFE sidechain channel is maintained within a specified threshold of being level, before and after nonlinear signal synthesis.

20 Claims, 20 Drawing Sheets

(51) Int. Cl.
    *H04R 5/02*            (2006.01)
    *H04R 5/04*            (2006.01)
    *H04S 3/00*            (2006.01)

(52) U.S. Cl.
    CPC .......... *H04S 3/008* (2013.01); *H04S 2400/01* (2013.01); *H04S 2400/07* (2013.01); *H04S 2400/13* (2013.01)

(56) References Cited

U.S. PATENT DOCUMENTS

| | | |
|---|---|---|
| 9,590,580 B1 | 3/2017 | You |
| 10,818,310 B2 | 10/2020 | Cassidy et al. |
| 2005/0245221 A1 | 11/2005 | Beyer |
| 2007/0140511 A1 | 6/2007 | Lin et al. |
| 2010/0215192 A1 | 8/2010 | Minnaar |
| 2011/0176696 A1 | 7/2011 | Kasargod et al. |
| 2016/0112023 A1 | 4/2016 | Croft, III |
| 2018/0242083 A1 | 8/2018 | Lindemann |
| 2020/0162817 A1 | 5/2020 | Neoran et al. |
| 2020/0404446 A1 | 12/2020 | Filos et al. |
| 2021/0120362 A1 | 4/2021 | Lehnert et al. |

OTHER PUBLICATIONS

Specht, D.F., "A General Regression Neural Network", IEEE Transactions on Neural Networks, Nov. 1991, pp. 568-576, vol. 2, No. 6, IEEE, United States.
Mitra, S.K., "Digital Signal Processing: A Computer Based Approach." 1998, pp. 462-467, McGraw-Hill, New York, United States.
Oppenheim, A.V. et al., "Discrete-Time Signal Processing", 2009, pp. 782-787, Prentice-Hall, United States.

\* cited by examiner

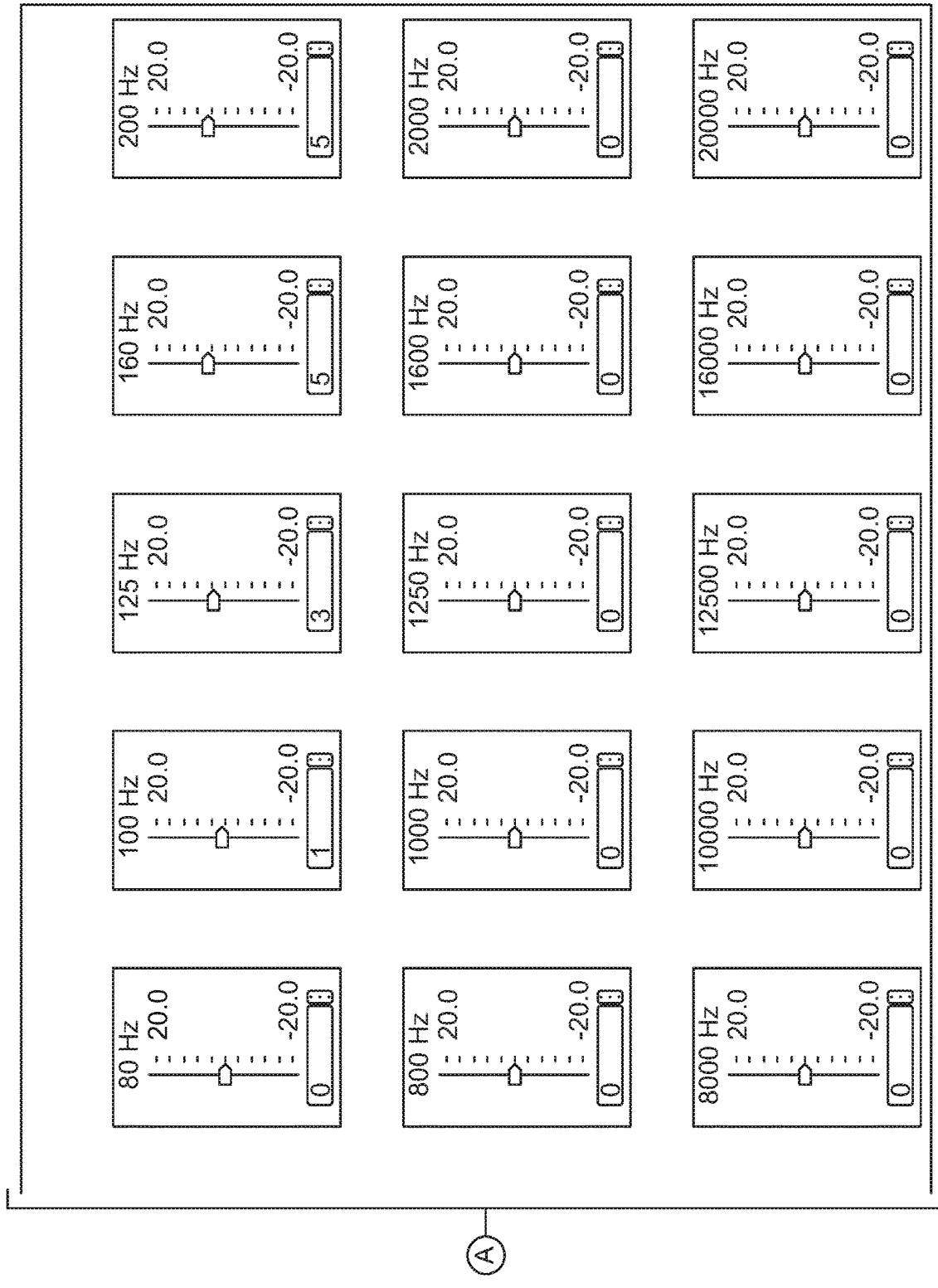

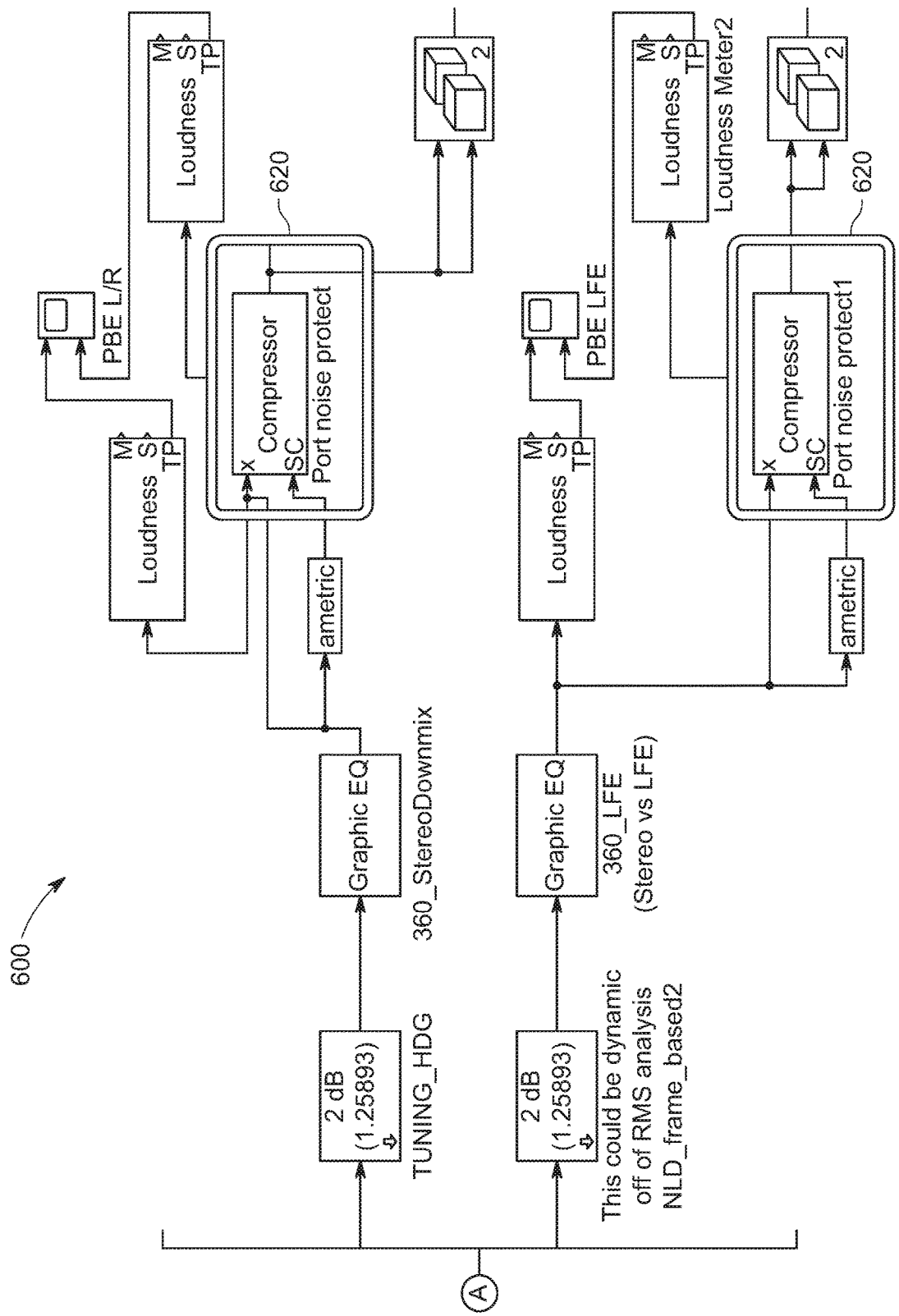
FIG. 6 (Continued...)

PERCEPTUAL BASS EXTENSION WITH LOUDNESS MANAGEMENT AND ARTIFICIAL INTELLIGENCE (AI)

CROSS-REFERENCE TO RELATED APPLICATIONS

This application claims the priority benefit of U.S. Provisional Patent Application Ser. No. 63/226,951, filed Jul. 29, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to sound quality of a loudspeaker, and in particular, to bass extension for a loudspeaker for improving sound quality.

BACKGROUND

As loudspeaker and devices become thinner and smaller, the bass generating capabilities of the device is significantly impacted. In fact, low-frequency signals cannot be reproduced on such loudspeaker-drivers due to a significant amount of distortion that could be introduced.

SUMMARY

One embodiment provides a computer-implemented method that includes implementing a customizable compressor for at least one sidechain processing associated with a loudspeaker. Machine learning is applied to automatically tune one or more parameters of the at least one sidechain processing. One or more channels are extracted, including a low-frequency effects (LFE) channel, for nonlinear signal synthesis. A proportional power-sum-based mix-in of an LFE sidechain channel is applied into a non-LFE sidechain. The LFE sidechain channel is maintained within a specified threshold of being level, before and after nonlinear signal synthesis.

Another embodiment includes a non-transitory processor-readable medium that includes a program that when executed by a processor performs bass extension for a loudspeaker including implementing, by the processor, a customizable compressor for at least one sidechain processing associated with the loudspeaker. The processor applies machine learning to automatically tune one or more parameters of the at least one sidechain processing. The processor extracts one or more channels, including a low-frequency effects (LFE) channel, for nonlinear signal synthesis. The processor applies a proportional power-sum-based mix-in of a LFE sidechain channel into a non-LFE sidechain. The processor maintains the LFE sidechain channel within a specified threshold of being level, before and after nonlinear signal synthesis.

Still another embodiment provides an apparatus that includes a memory storing instructions, and at least one processor executes the instructions including a process configured to implement a customizable compressor for at least one sidechain processing associated with a loudspeaker. Machine learning is applied to automatically tune one or more parameters of the at least one sidechain processing. One or more channels, including a low-frequency effects (LFE) channel, is extracted for nonlinear signal synthesis. A proportional power-sum-based mix-in of an LFE sidechain channel is applied into a non-LFE sidechain. The LFE sidechain channel is maintained within a specified threshold of being level, before and after nonlinear signal synthesis.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to sound quality of a loudspeaker, and in particular, to bass extension for a loudspeaker for improving sound quality. One embodiment provides a computer-implemented method that includes implementing a customizable compressor for at least one sidechain processing associated with a loudspeaker. Machine learning is applied to automatically tune one or more parameters of the at least one sidechain processing. One or more channels are extracted, including a low-frequency effects (LFE) channel, for nonlinear signal synthesis. A proportional power-sum-based mix-in of an LFE sidechain channel is applied into a non-LFE sidechain. The LFE sidechain channel is maintained within a specified threshold of being level, before and after nonlinear signal synthesis. In one aspect of the disclosed technology, the side-chain main-channel (L+R) as well as the LFE sidechain signal is analyzed and compared before NLD and after NLD, and a correction gain is applied to the LFE side-chain after the NLD so as to maintain the relative level-balance after NLD.

For expository purposes, the terms "speaker," "speaker device," "speaker system," "loudspeaker," "loudspeaker device," and "loudspeaker system" may be used interchangeably in this specification.

Bass constitutes a significant portion of the listening experience. TVs and soundbars are getting thinner and slimmer and as such these are incapable of reproducing the desired bass output. Mounting these close to a wall does not suffice either in terms of low-frequency reinforcement. Accordingly, some embodiments include signal processing and artificial intelligence (AI) techniques (embedded in a digital signal processor (DSP) or a machine learning (ML) accelerator) which are required to overcome this limitation.

Figure 1A:
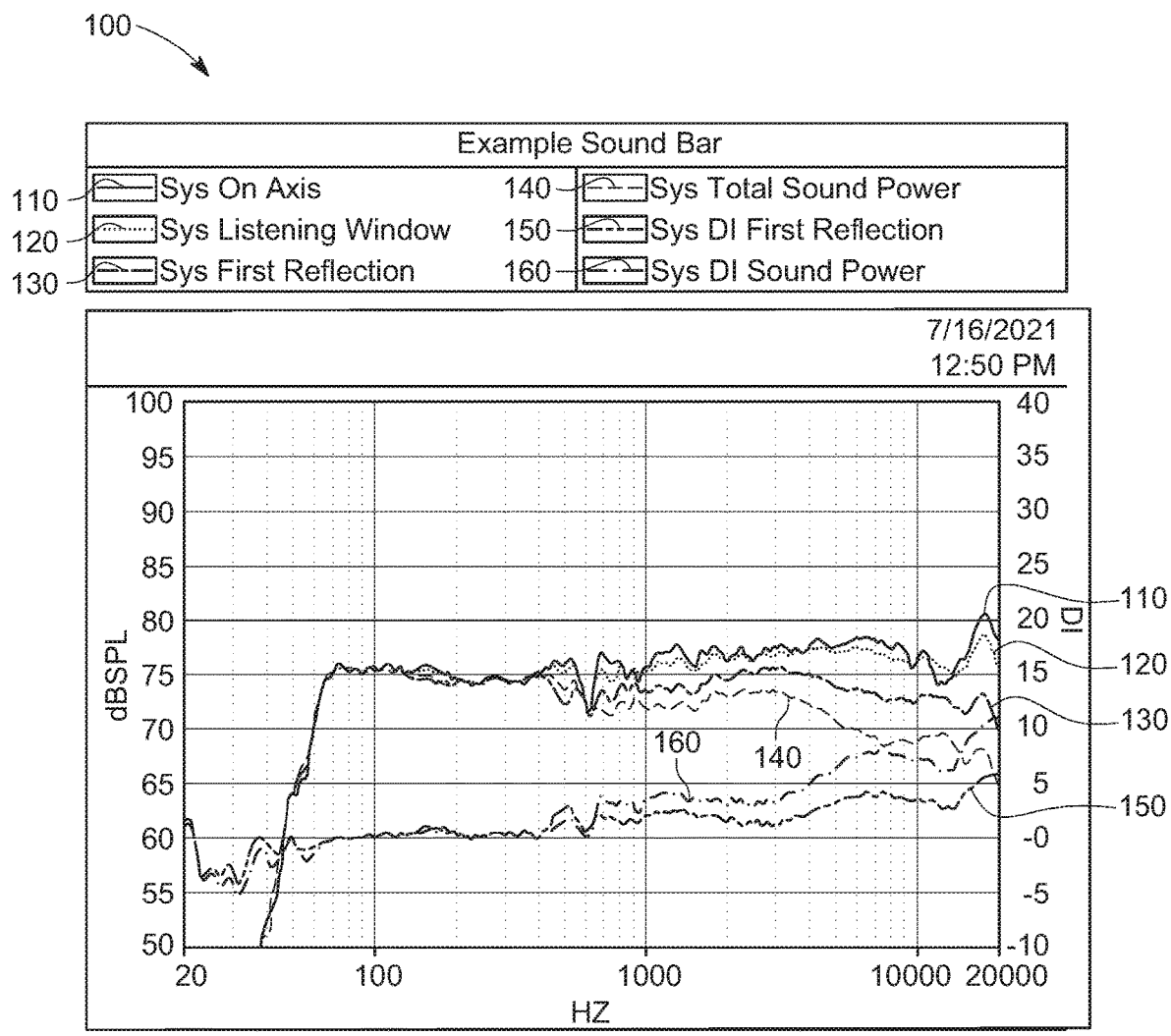
FIG. 1A illustrates an example television (TV) magnitude response in a chamber.

FIG. 1A illustrates a graph 100 for an example television (TV) magnitude response in a chamber. Graph 100 shows curves for: system on axis 110, system listening window 120, system first reflection 130, system total sound power 140, system, system diffraction first reflection 150 and system diffraction sound power 160. Graph 100 shows the magnitude response of a bass limited system that is incapable of producing low-frequencies (below ~65-70 Hz). In this case the male fundamental vocal frequency is lost impacting the naturalness of voice, and cinematic/music content bass (explosions, drums and effects) are lost (or filtered out) during playback. Accordingly, the various embodiments (such as algorithms/processing) provide improvement of the listening experience of bass, while preventing overdriving the loudspeakers. The various embodiments include (i) an "active" sidechain for synthesizing non-linear signals which are mixed back in the main signal chain, (ii) side-chain processing the LFE signal and mixing back into the main chain using a proportional power approach, (iii) maintaining the relative level balance before and after NLD between LFE and main channel side-chains (iv) dynamic adjustments to the algorithm/processing to compensate for playback gain of the TV or soundbar, (v) a compressor engine in the sidechain to improve loudness and minimize port noise buzzing, and (vi) AI engine to enable automated tuning of the algorithm parameters. The compressor amplifies/attenuates the peak volumes of a track in order to create volumes closer to the overall average volume. Compression allows for a mix to sound cleaner. Sidechain compression is essentially regular compression with more specific automation, and performs to duck the volume of a particular frequency to create space for another instrument/expressed signal.

In order to create bass, significant volume displacement is required of loudspeaker drivers which leads to high power requirements, expensive transducer/loudspeaker costs, and the need to embed high quality and expensive power amplifiers in products. Such requirements are in conflict with industrial design (ID), product dimensions, purchasing/cost targets, and hence profit margins. In some embodiments, the disclosed technology may include (but is not limited to): custom compressor in the sidechains, low frequency effects (LFE) extraction with non-linear synthesis and limiting with proportional power-sum based mix-in, independent Left (L)/Right (R)/Center (C)/L surround (Ls)/R surround (Rs)/etc. channels for sidechain synthesis, dynamic equalization of the harmonic and/or main channel signals based on playback gain and loudness contour (see FIG. 1B; including interpolation with linear or AI techniques), and ML/AI techniques for automatic tuning of sidechain non-linear signal synthesis parameters based on various types of signals. Sidechain compression allows routing of a signal from one track to the input of a compressor device on another track to trigger a limiting effect.

Figure 1B:
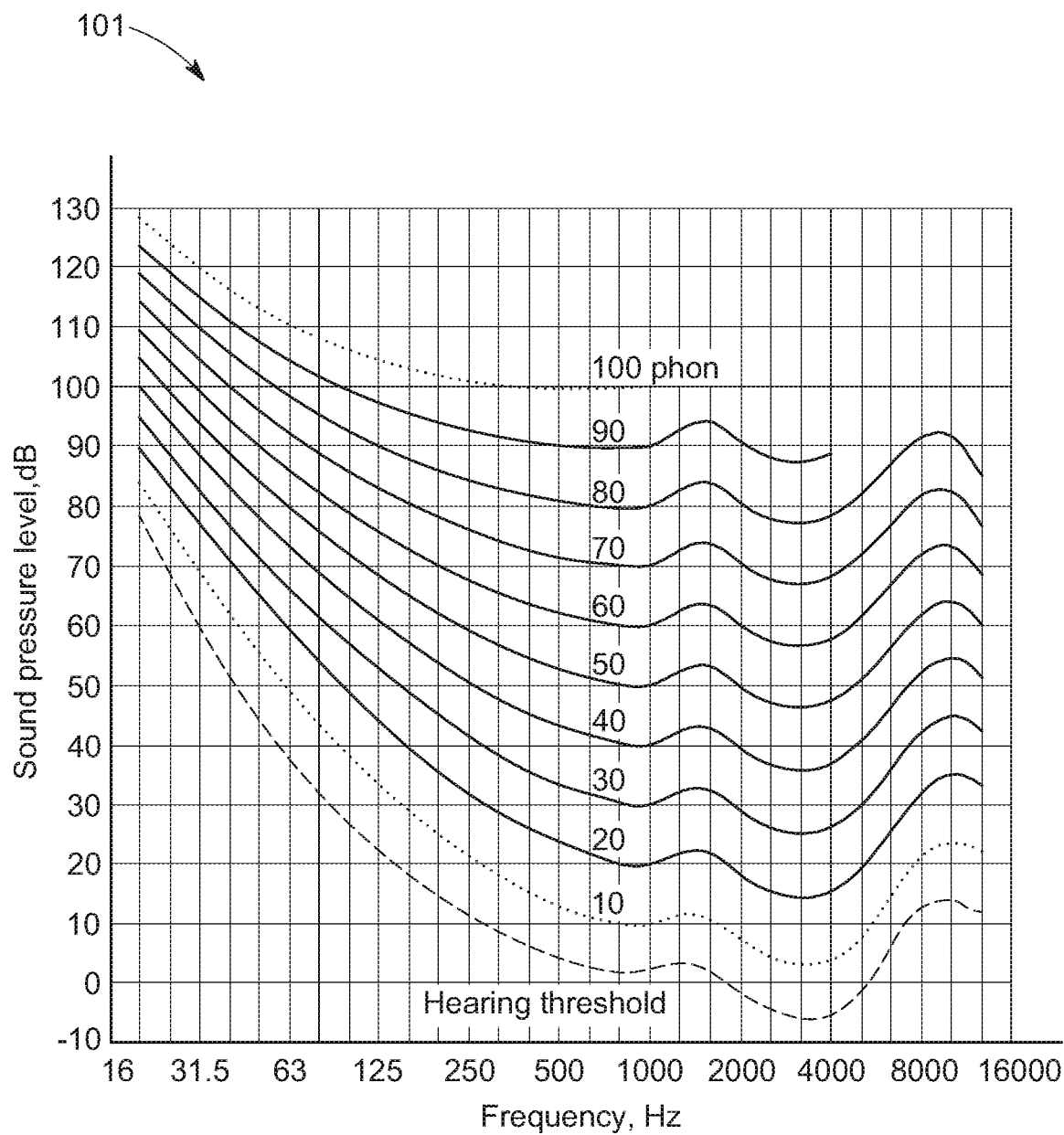
FIG. 1B illustrates a graph of example equal loudness contours based on International Standards Organization (ISO 226:2003)

FIG. 1B illustrates a graph 101 of example equal loudness contours based on International Standards Organization (ISO 226:2003). The graph 101 shows sound pressure level (SPL) in dB versus frequency in Hz where the contours are listed in phon (a unit used to describe the loudness level of a given sound or noise). Perception of bass is influenced by, for example, playback gain. Loudness perception is reflected in the loudness contours. For each curve traced with a number next to it (e.g. 1-to 100 phon) the equivalent sound level is shown by following the trace. Therefore, 80 phon=80 dB at 1 kHz but that same perceived level at 31 Hz is 110 dB. In order to compensate for this non-linear hearing, some embodiments apply a band limited inverse of this curve as implemented in a dynamic adjustment embodiment.

Figure 2:
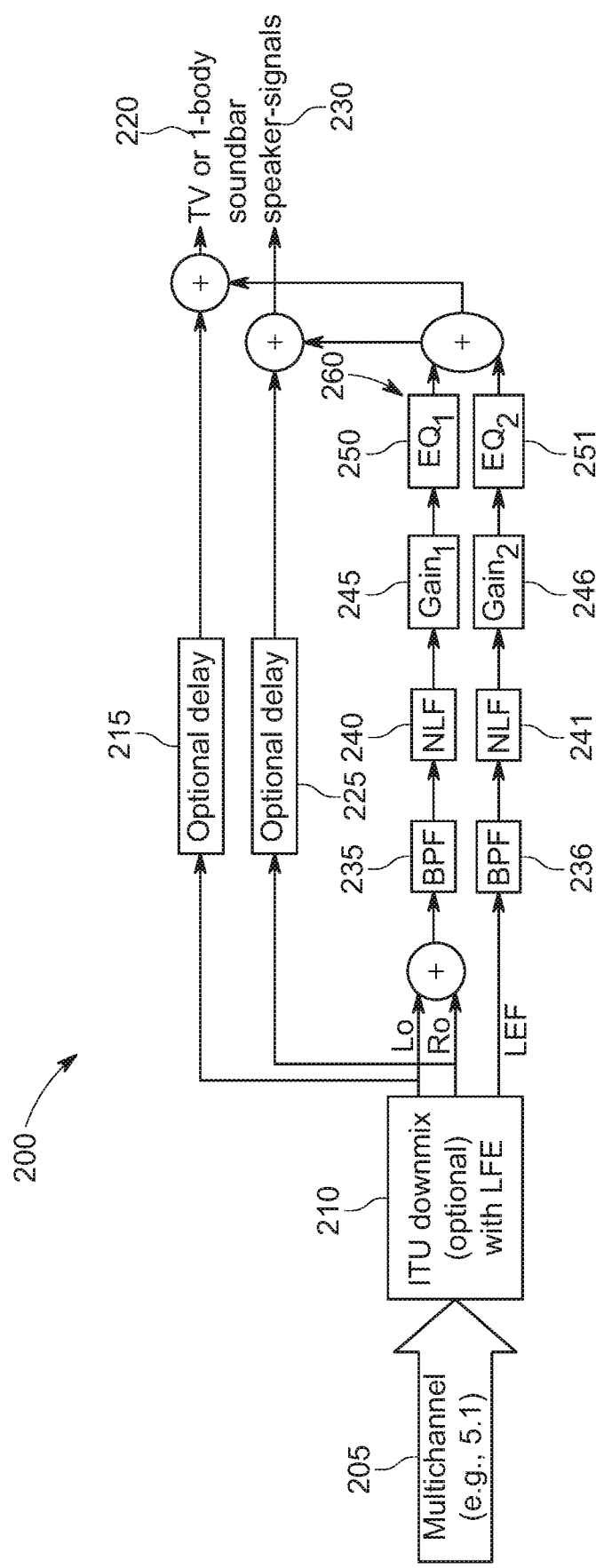
FIG. 2 illustrates a high-level processing system diagram for a stereo or multichannel system, according to some embodiments.

FIG. 2 illustrates a high-level processing system diagram 200 for a stereo or multichannel system, according to some embodiments. In some embodiments, the processing system diagram 200 includes multichannel (e.g., 5.1, etc.) source 205, an International Telecommunications Union (ITU) downmix (optional) with LFE 210, optional delay function 215, optional delay function 225, Berkely Packet Filter (BPF) 235, nonlinear function (NLF) 240, $Gain_L$ function 245, equalizer function ($EQ_L$) 250, BPF 236, NLF 241, $Gain_R$ 246, $EQ_R$ 251, and graphic equalizer 260 (see FIG. 4). Output 220 is provided to a TV or 1-body soundbar and output 230 is provided as speaker signals.

In some embodiments, the disclosed technology relies on the principle of the missing fundamental wherein the perception of bass is introduced by generating non-linear components of signals. For example, generating even and odd harmonics of a 50 Hz signal (e.g., 100 Hz, 150 Hz, 200 Hz, etc.) gives the perception of pitch of 50 Hz (evidenced as a difference between adjacent harmonic center frequencies). This fundamental premise helps achieve desirable bass performance, while maintaining the existing (i) thermal and mechanical limits of the transducers, (ii) inexpensive transducer/amplifier costs, while (a) improving flexibility for industrial design (ID), (b) product dimensions, purchasing/cost targets, and hence profit margins.

Figure 3:
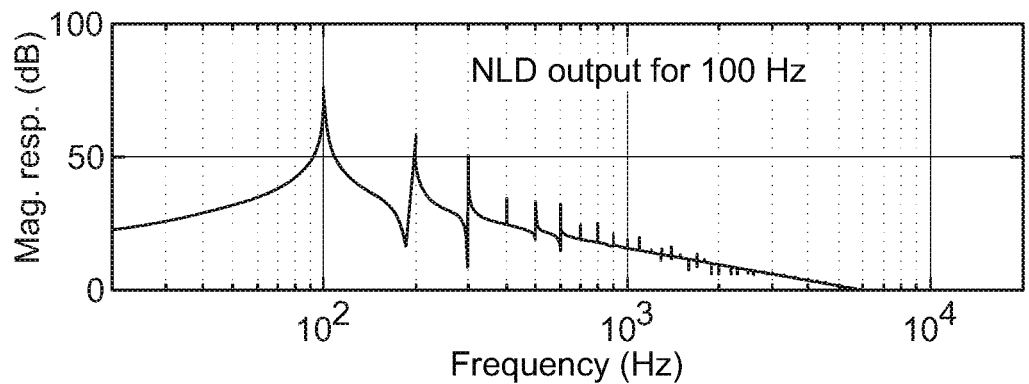
FIG. 3 illustrates graphs for non-linear device (NLD) output for 100 Hz and 150 Hz, according to some embodiments.
Figure 3:
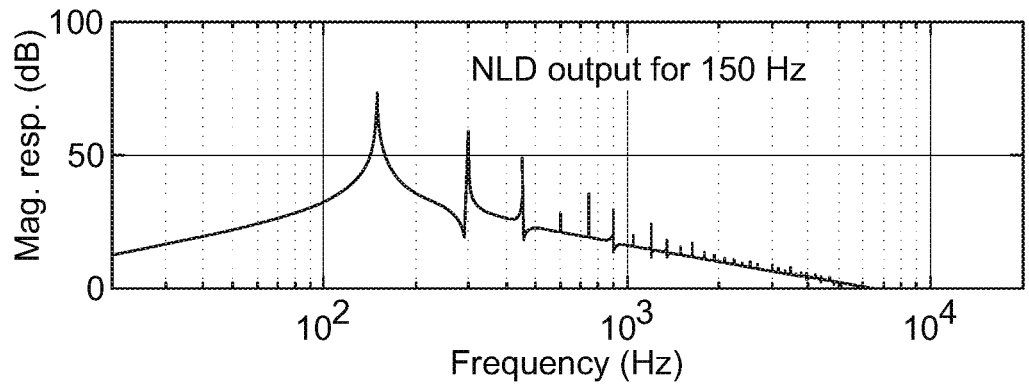

FIG. 3 illustrates graphs 300 and 310 for non-linear device (NLD) output for 100 Hz (graph 300) and 150 Hz (graph 310), according to some embodiments. In some embodiments, the NLF 240 (FIG. 2) is a filter applied in the time domain to generate even and odd harmonics. Note, a harmonic is a tone or spectrum of tones with an integer multiple of the original/input frequency greater than 1. One example of such a function (many types can be used) is defined in the following equation:

$$x_d(n)=\alpha x(n)+(1-\alpha)x_d(n-1); x_d(n) > x_d(n-1)$$

$$x_d(n)=\beta x(n)+(1-\beta)x_d(n-1); \tilde{x}(n) \leq x_d(n-1)$$

$$\alpha=1-e^{-(1/f_s)*(1/\tau_r)}$$

$$\beta=1-e^{-(1/f_s)*(1/\tau_f)}.$$

The graph 300 shows the frequency response (of the NLF 240) to a sine wave stimulus of 100 Hz. With a complex signal (real use case) the harmonics are applied to the complex band-limited input signal.

System diagram 200 (FIG. 2) is one way to isolate the fundamental from the harmonics (if needed). Note the subtract operation where the input to the NLF 240 is subtracted from the output, leaving the harmonics the function generates. The gains for the (optional) fundamental feed-thru and (required) harmonic sections are used to balance the ratio between fundamental and its harmonics. Alternatively, a tuned high-pass filter (HPF) or a cascade of band-pass filters (BPF) may be used to selectively reject the harmonics. One alternative embodiment includes an NLF that generates $2^{nd}$ and $3^{rd}$ order harmonics, and is described as follows:

$$y(i)=NLa*x(i)^\wedge(3)+NLb*x(i)^\wedge(2)+NLg*x(i)+NLd;$$

where (for example) NLa=0.75; NLb=0.5; NLg=0.5; NLd=0.

Figure 4:
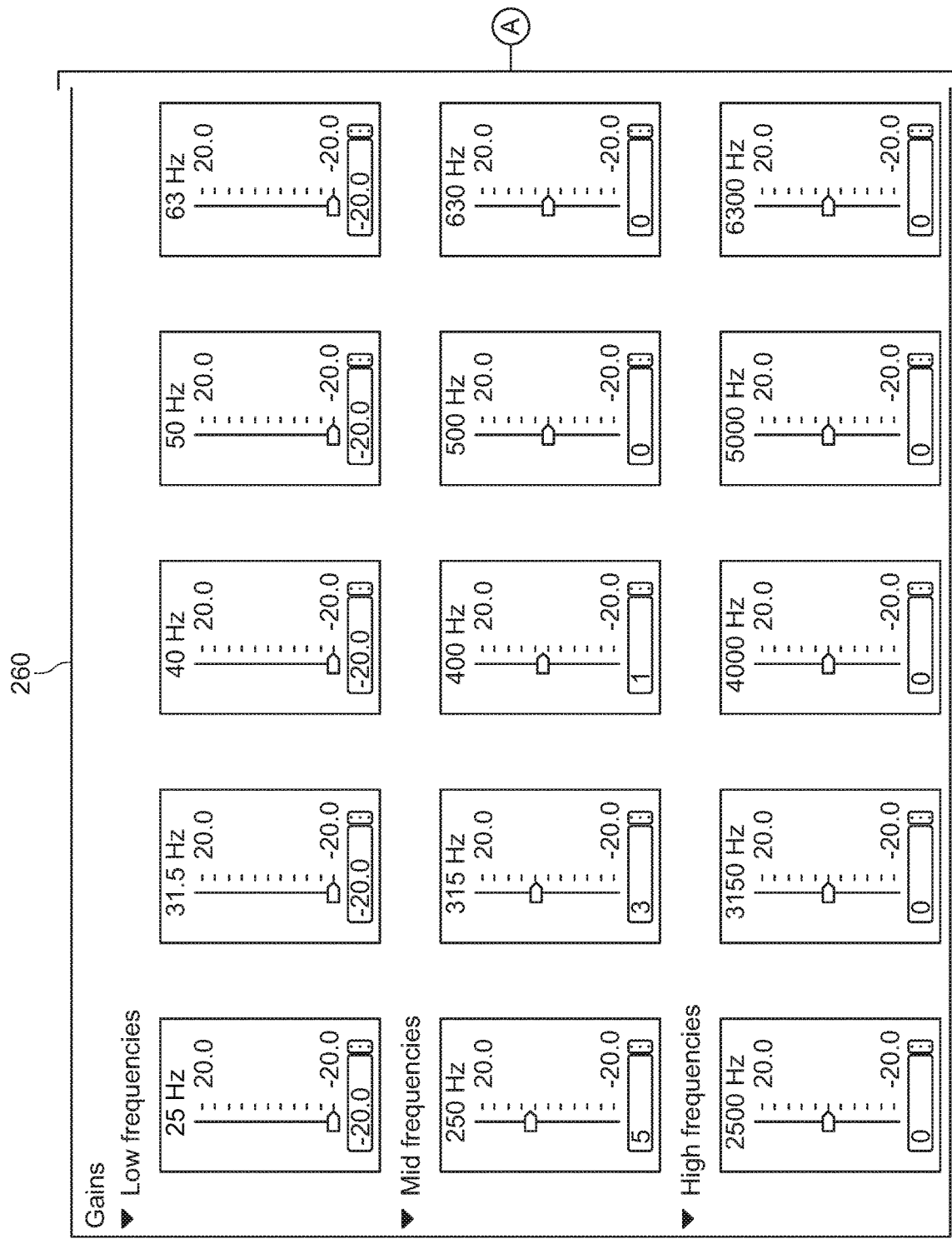
FIG. 4 illustrates an example of a ⅓ octave graphic equalizer, according to some embodiments.

FIG. 4 illustrates an example of a ⅓ octave graphic equalizer 260, according to some embodiments. The ⅓ octave graphic equalizer 260 allows the tuner to control the generated harmonics spectral balance by ensuring proper timbre-match between the audio content played back from a reference full-range loudspeaker and the same content played back on a bass-limited loudspeaker.

Figure 5A:
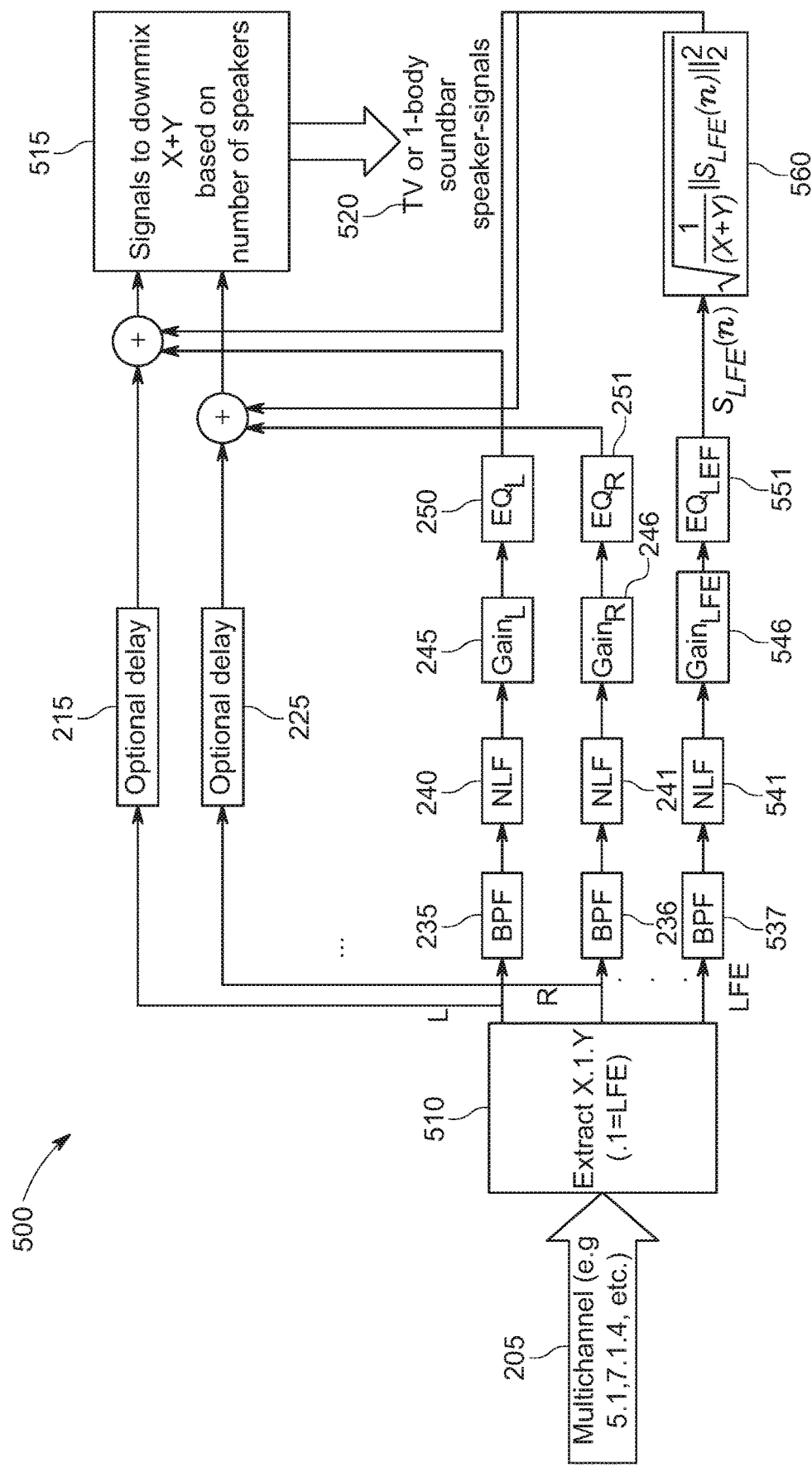
FIG. 5A illustrates another high-level processing system diagram for multichannel harmonic generation plus low frequency effects-root mean square (LFE-RMS) proportional summation, according to some embodiments.

FIG. 5A illustrates another high-level processing system diagram 500 for multichannel harmonic generation plus low frequency effects-root mean square (LFE-RMS) proportional summation, according to some embodiments. In some embodiments, the processing system diagram 500 includes multichannel (e.g., 5.1, etc.) source 205, extract X.1.Y processing 510 with 0.1 LFE, optional delay function 215, optional delay function 225, signals to downmix X+Y based on number of speakers 515 to output 520 (TV or 1-body soundbar speaker signals), BPF 235, NLF 240, $Gain_L$ function 245, $EQ_L$ 250, BPF 236, NLF 241, $Gain_R$ 246, $EQ_R$ 251, BPF 537, NLF 541, $Gain_{LFE}$ 546, $EQ_{LFE}$ 551 and $S_{LFE}$ (n) function 560

$$\sqrt{\frac{1}{(X+Y)}\|S_{LFE}(n)\|_2^2}.$$

In some embodiments, the LFE is a synthesized low-frequency signal that is distributed equally to all loudspeakers (other than a subwoofer when a subwoofer is absent as in TV or 1-body soundbar). The BPF 537 (Butterworth $2^{nd}$ order or higher), NLF 541 (type and parameters), $Gain_{LFE}$ 546 and $EQ_{LFE}$ 551 are tuned to a set of content. The NLF 541 generates even and odd harmonics (one example with equations and tuning parameters above, other embodiments may include a trained neural network (NN) model to generate even and/or odd harmonics based on input signals). In one or more embodiments, the optional delay 215/225 in the main chain is a fixed (frequency-independent) delay or an all-pass derived frequency-dependent group delay to align the sidechain delay with the main chain. The main chain may be adapted to include an additional high-pass filter with optional fixed or appropriate frequency-dependent delay.

Figure 5B:
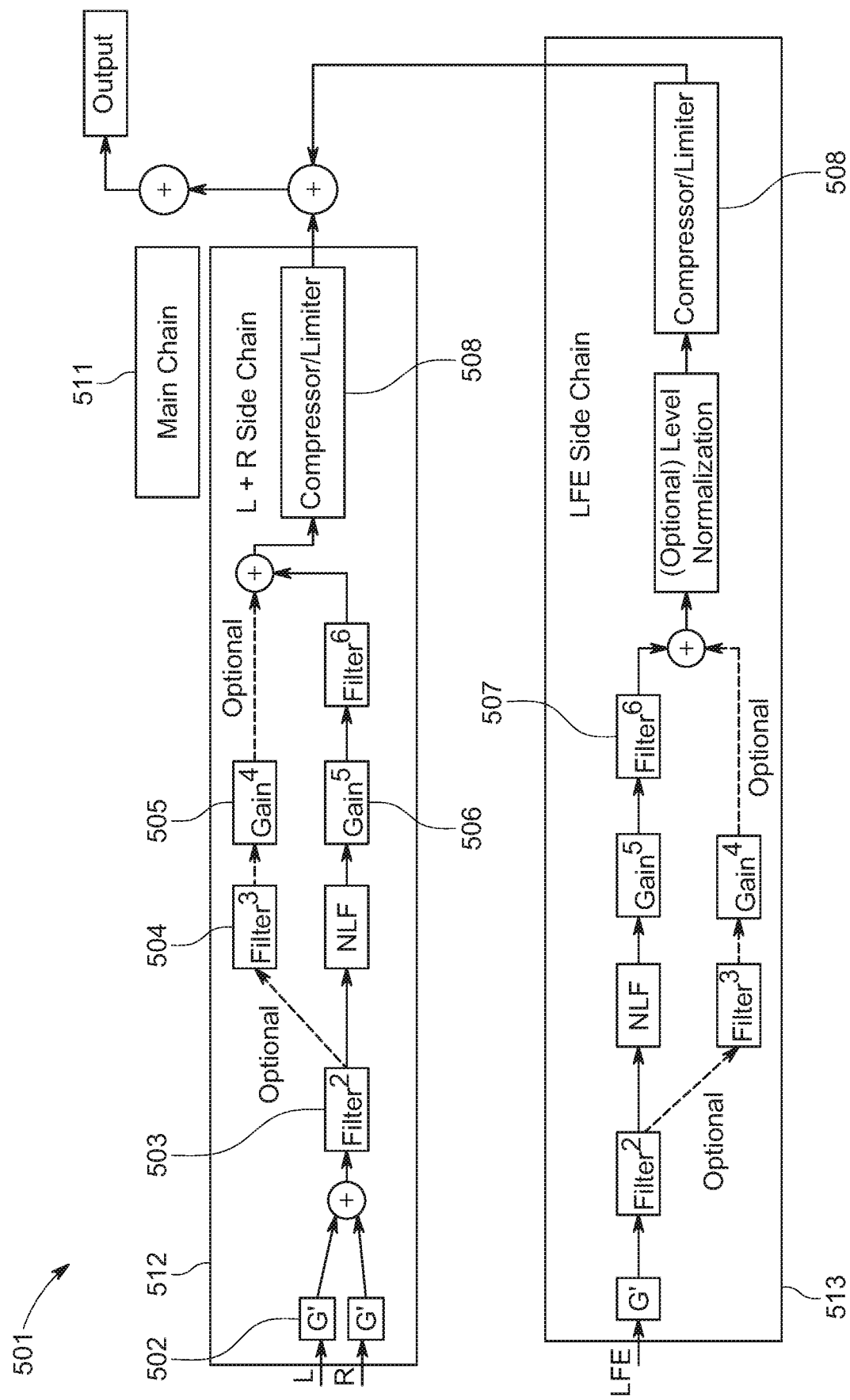
FIG. 5B illustrates a high-level processing system diagram showing tuning the gains and filtering of sidechains, according to some embodiments.

FIG. 5B illustrates a high-level processing system diagram 501 showing tuning the gains and filtering of sidechains, according to some embodiments. $G^1$ 502 is the gain applied to the input of the sidechain 512. $G^1$ 502 may be adjusted to increase or decrease sidechain bass enhancement based on observed compressor/limiter 508 behavior and tonal balance measured with pink noise. In some embodiments, filter² 503 may typically be a band-pass and optional be all-pass filters to restrict frequency range based on device capability and adjust phase summation with the main chain 511. Typically the frequency F3 points (half-power) are 1-1.5 octaves lower than the useful frequency cutoff of the speaker through ~½ and octave higher than the frequency cutoff (e.g., for a 65 Hz device ~30-100 Hz bandpass may be used). If there is too much negative impact of higher harmonics on the voice or in order to reduce spatial cancellation issues incurred with higher frequencies (typically above 300 Hz), some embodiments lowpass the input signal no higher than ~150 Hz. Filter³ 504 provides frequency shaping and may typically be a series of parametric equalizer (PEQ) filters in cascade used to achieve desired low frequency shape for pass-thru original signal. Gain⁴ 505 provides gain for a pass-thru original signal, and may be used to balance fundamental and harmonic signal levels (typically the target is to have similar levels between harmonics and fundamental for the L/R chain(s) and lower level for the fundamental for LFE sidechain 513 (or absent path) to minimize overdriving issues or make space for more harmonic signal. Gain⁵ 506 provides gain for the harmonic generated signal that has the majority of its fundamental rejected (+10 dB or greater $2^{nd}$ harmonic relative to fundamental). Harmonic gain may be adjusted up if the lower perceived tones (those which are below the range of the speaker) are too subtle/inaudible, and may be reduced if there is roughness or atonal misbehavior (unexpected/unwanted pitches observed with specific content). Filter$^6$ 507 may typically be a graphic equalizer filter used to emphasize certain frequency ranges of the harmonic signal. In some embodiments this adds large amounts of gain within the $2^{nd}$-$3^{rd}$ harmonic range of the missing fundamental range (e.g., 30-65 Hz).

Figure 6:
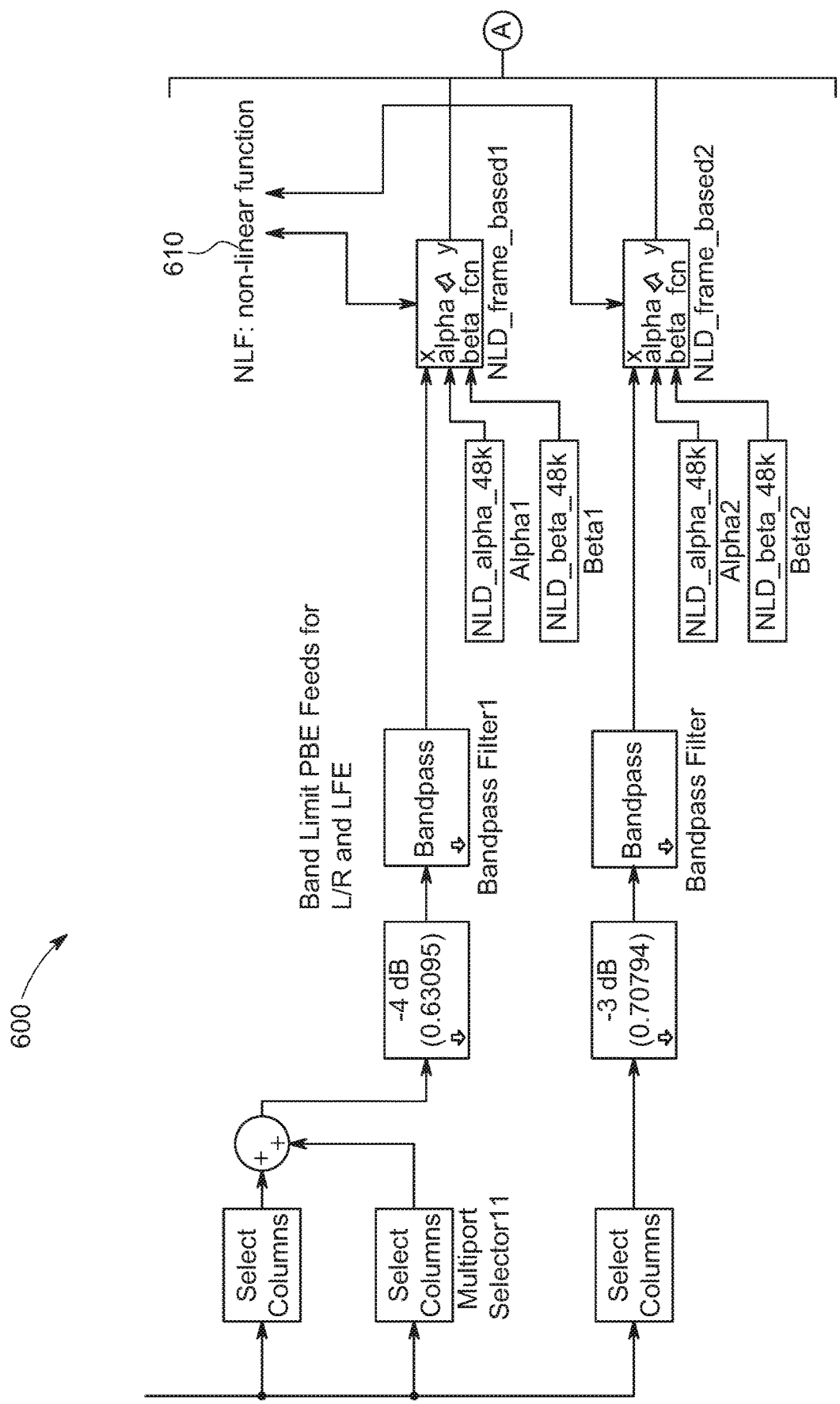
FIG. 6 illustrates yet another high-level processing system diagram for sidechain compressor(s), according to some embodiments.

FIG. 6 illustrates yet another high-level processing system diagram 600 for sidechain compressor(s) 620, according to some embodiments. In processing diagram 600, the NLF 610 for the L+R sidechain is NLD based 1, and the NLF 610 for the LFE sidechain is NLD based 2. Independent compressor 620 with sidechain applied to the L/R path and independent compressor 620 applied for the LFE perceptual bass extension (PBE) path are used to control the bass added to the signal to minimize port noise and vibrational issues under peak signal conditions. Further, the independent compressors 620 are used to ensure the signal does not overflow. The X on compressor 620 is the input signal, and the impact of the compressor 620 on the peak output is reduction of the input signal. The use of sidechain input (SC) is to increase/decrease the signal level of a specific frequency range for the purposes of fine-tuning the compressor 620 levels on a spectral basis. In this case it allows the compressor 620 to engage sooner with energy near port resonance where port chuffing is most audible using a PEQ or other filtering. In some embodiments, when the PBE processing is engaged there is dramatic improvement in the perception of bass extension and output loudness without adding any extra loudspeaker port noise or any other distortion (subject to proper tuning).

In some embodiments, the thresholds for the compressors 620 are adjusted such that the peak level of each of the sidechains makes no more than ~−8→−10 dB (with LFE harmonic chain limited to ~−16 dB) such that the summed sidechain signal does not overload the woofer or port, and does not induce enclosure buzzing that is audible over masking content (with 0 dB peak output signal). In one or more embodiments, tightening the threshold and increasing the compressor ratio or increasing the sidechain boost (in order to compress sooner around problem frequencies) is performed if the sidechain is creating undesirable distortions.

Figure 7:
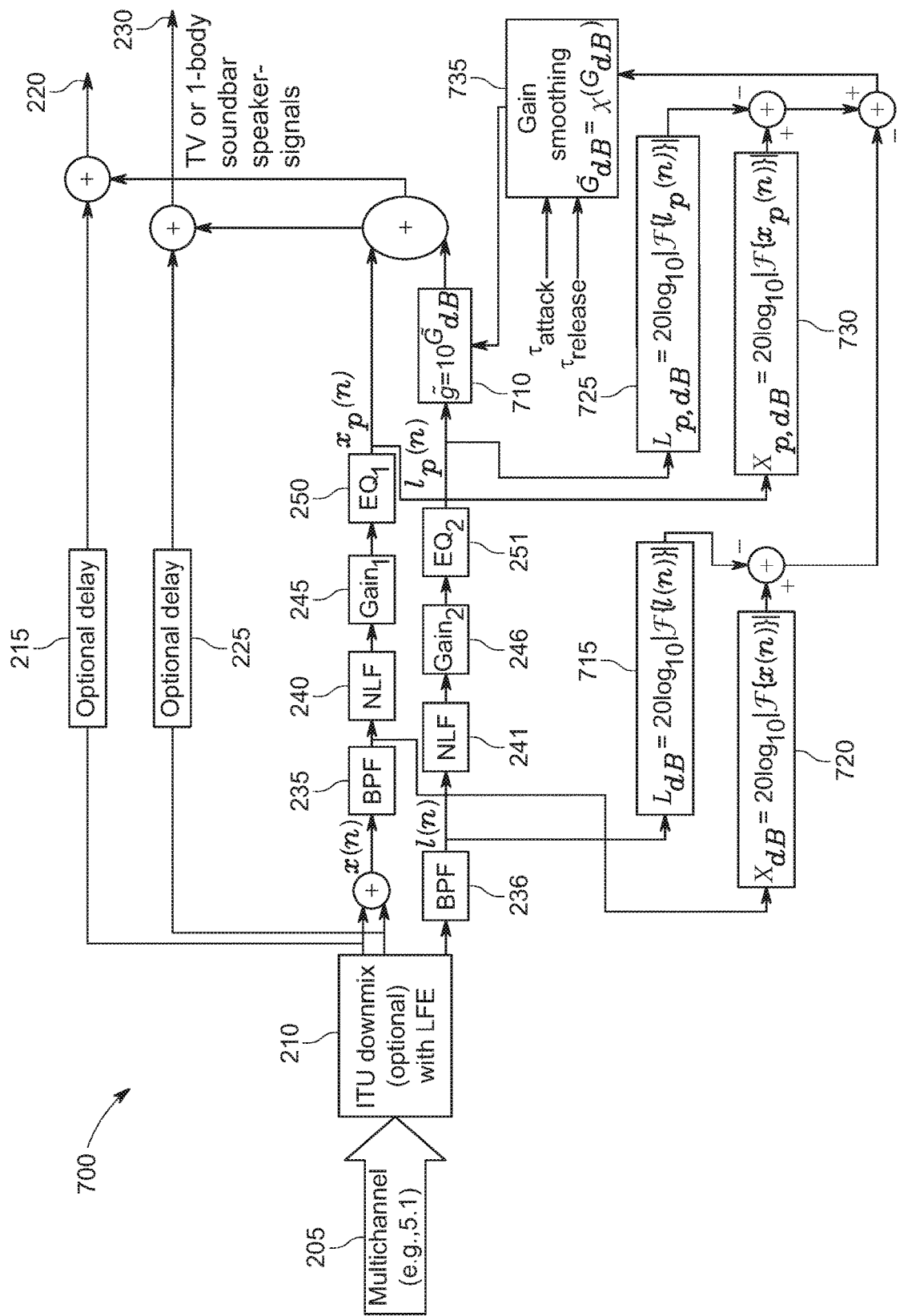
FIG. 7 illustrates still another high-level processing system diagram for level matching and gain smoothing for LFE sidechain, according to some embodiments.

FIG. 7 illustrates still another high-level processing system diagram 700 for level matching and gain smoothing for LFE sidechain, according to some embodiments. In some embodiments, the processing system diagram 700 includes multichannel (e.g., 5.1, etc.) source 205, an ITU downmix (optional) with LFE 210, optional delay function 215, optional delay function 225, BPF 235, NLF 240, Gain$_L$ function 245, EQ$_L$ 250, BPF 236, NLF 241, Gain$_R$ 246, EQ$_R$ 251, function 710 ($\tilde{g}=10^{G_{dB}}$), function 715 $L_{dB}=20 \log_{10}|F\{l(n)\}|$, function 720 $X_{dB}=20 \log_{10}|F\{x(n)\}|$, function 725 $L_{p,dB}=20 \log_{10}|F\{l_p(n)\}|$, function 730 $X_{p,dB}=20 \log_{10}|F\{x_p(n)\}|$, and gain smoothing function 735 $G_{dB}=X(G_{dB})$.

In some embodiments, the gain in LFE synthesis chain is modified based on frame-by-frame basis by comparing the level difference between L+R (filtered) before (after processing of function 720) non-linear synthesis and after (after processing of function 730) non-linear synthesis and any gain/eq processing, and the resulting gain is smoothed using a 1-pole filter with time-constants (function 735).

Figure 8:
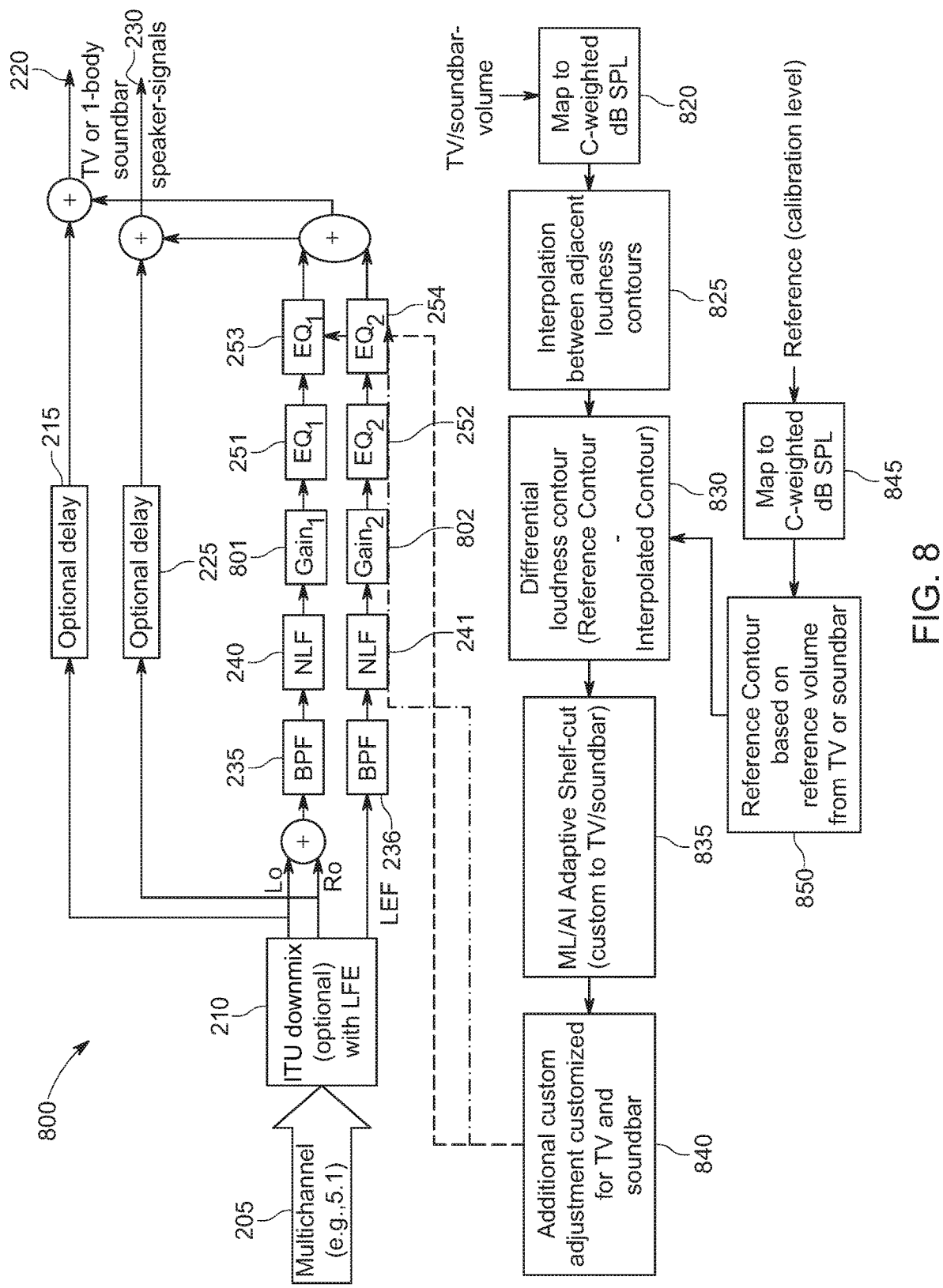
FIG. 8 illustrates a high-level processing system diagram for dynamic adjustment based on system gain, according to some embodiments.

FIG. 8 illustrates a high-level processing system diagram 800 for dynamic adjustment based on system gain (e.g., volume), according to some embodiments. In some embodiments, the processing system diagram 800 includes multichannel (e.g., 5.1, etc.) source 205, an ITU downmix (optional) with LFE 210, optional delay function 215, optional delay function 225, BPF 235, NLF 240, Gain$_1$ function 801, EQ$_1$ 251, EQ$_1$ X 253, BPF 236, NLF 241, Gain$_2$ function 802, EQ$_2$ 252, EQ$_1$ Y 254, processing 820 (map to C-weighted (representing what humans hear when sound is turned up) dB SPL), processing 825 (interpolation between adjacent loudness contours), processing 830 (differential loudness contour (reference contour—interpolated contour)), processing 835 (ML/AI adaptive shelf-cut (custom to TV/soundbar), processing 840 (additional custom adjustment customized for TV and soundbar), processing 845 (map C-weighted dB SPL) and processing 850 (reference contour based on reference volume from TV or soundbar (e.g., lookup table)). The TV/soundbar volume is input to the processing 820 and the reference (calibration level) is input to the processing 845. In one embodiment the ML system is a General Regression Neural Network (GRNN) or could be a fully connect feedforward neural network (FNN), a convolutional neural network (CNN), a linear regressor, polynomial function, etc.

Figure 9:
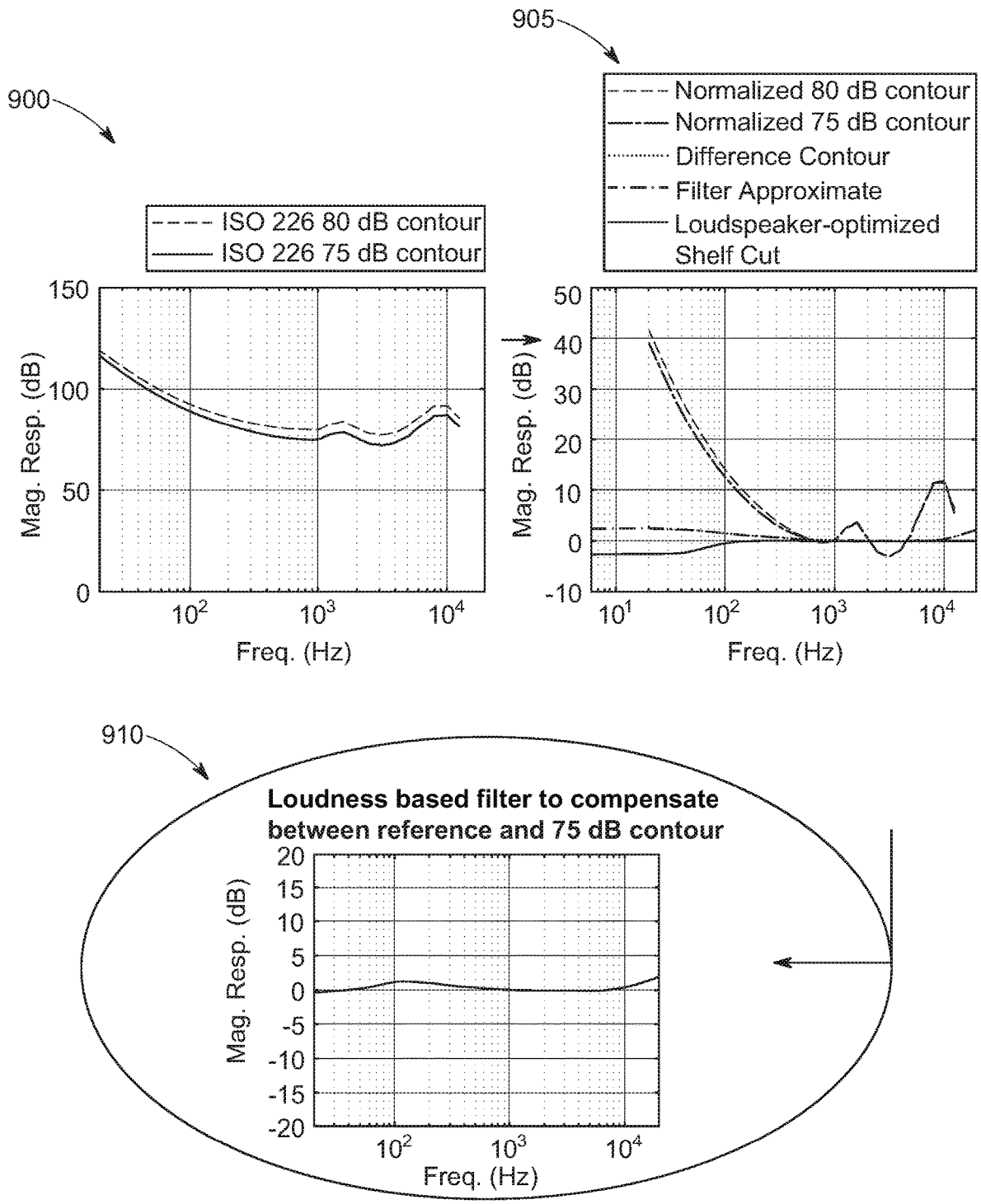
FIG. 9 illustrates graphs showing results of dynamic adjustment from an example soundbar, according to some embodiments.

FIG. 9 illustrates graphs 900, 905 and 910 showing results of dynamic adjustment from an example soundbar, according to some embodiments. In some embodiments, the graphs 900, 905 and 910 are a result of example processing 835 (FIG. 8, ML/AI adaptive shelf-cut filter (custom to TV/soundbar)). Graph 900 shows the magnitude response (dB) versus frequency (Hz) for an 80 dB contour and a 75 dB contour. Graph 905 shows the magnitude response (dB) versus frequency (Hz) for a normalized 80 dB contour, a normalized 75 dB contour, a difference contour, filter approximate and loudspeaker-optimized shelf cut filter. Graph 910 shows the magnitude response (dB) versus frequency (Hz) for a loudness based filter to compensate between the reference and a 75 dB contour. In one or more embodiments, processing 835 is an effective filter to have a timbre match based on different playback gain where the reference is V40 (SPL 80 dBC), and playback volume is adjusted by user is V30 (75 dBC). Where dBC is the ratio of input signal power versus the carrier signal power and is known as the decibels relative to the carrier.

Figure 10:
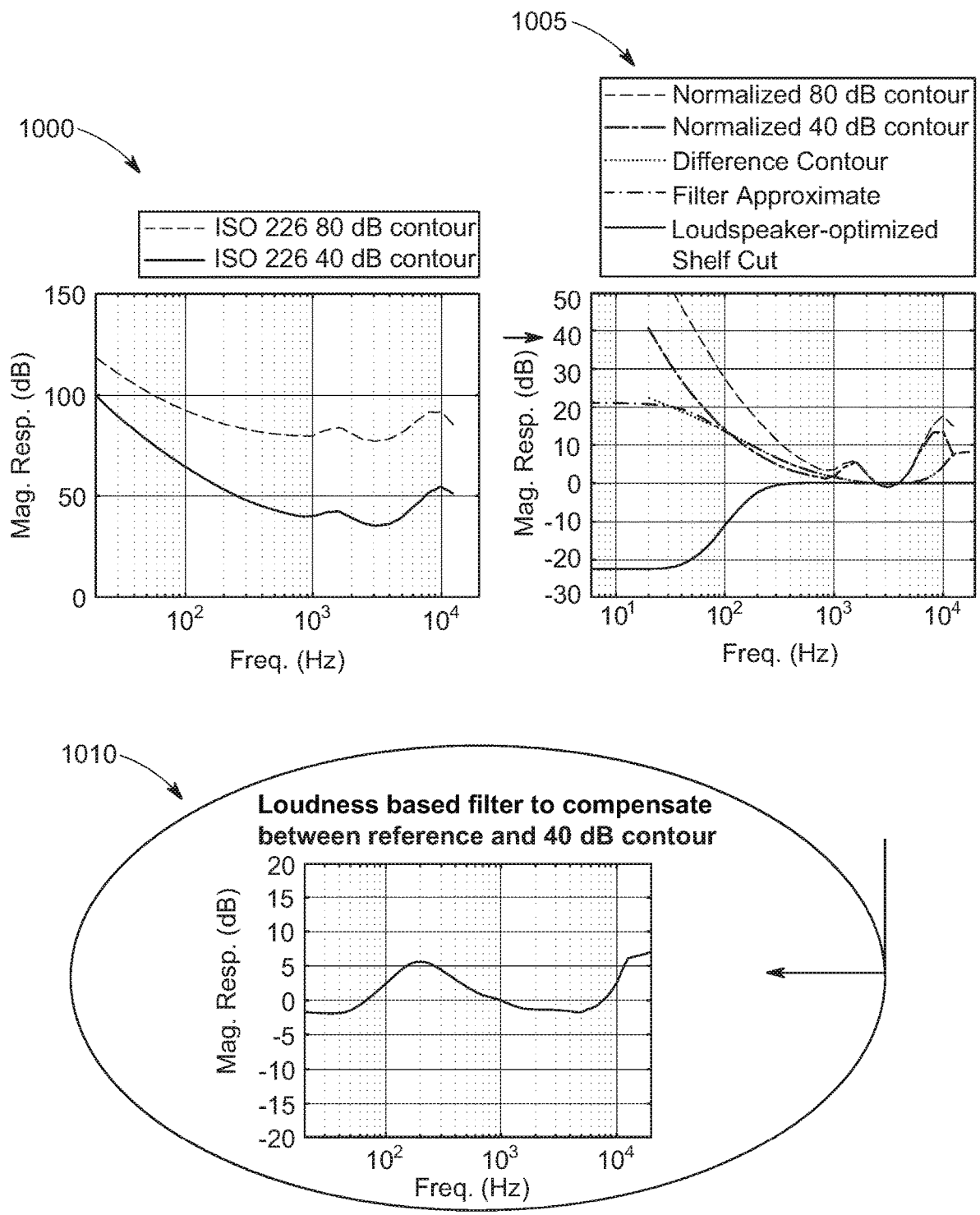
FIG. 10 illustrates graphs showing results of another dynamic adjustment from an example soundbar, according to some embodiments.

FIG. 10 illustrates graphs 1000, 1005 and 1010 showing results of another dynamic adjustment from an example soundbar, according to some embodiments. In some embodiments, the graphs 1000, 1005 and 1010 are a result of another example of processing 835 (FIG. 8, ML/AI adaptive shelf-cut filter (custom to TV/soundbar)). Graph 1000 shows the magnitude response (dB) versus frequency (Hz) for an 80 dB contour and a 40 dB contour. Graph 1005 shows the magnitude response (dB) versus frequency (Hz) for a normalized 80 dB contour, a normalized 40 dB contour, a difference contour, filter approximate and loudspeaker-optimized shelf cut filter. Graph 1010 shows the magnitude response (dB) versus frequency (Hz) for a loudness based filter to compensate between the reference and a 40 dB contour. In one or more embodiments, processing 835 is an effective filter where a timbre match in this example is based on different playback gain where the reference is V40 (SPL 80 dBC), and playback volume is adjusted by user is VX (40 dBC).

Figure 11A:
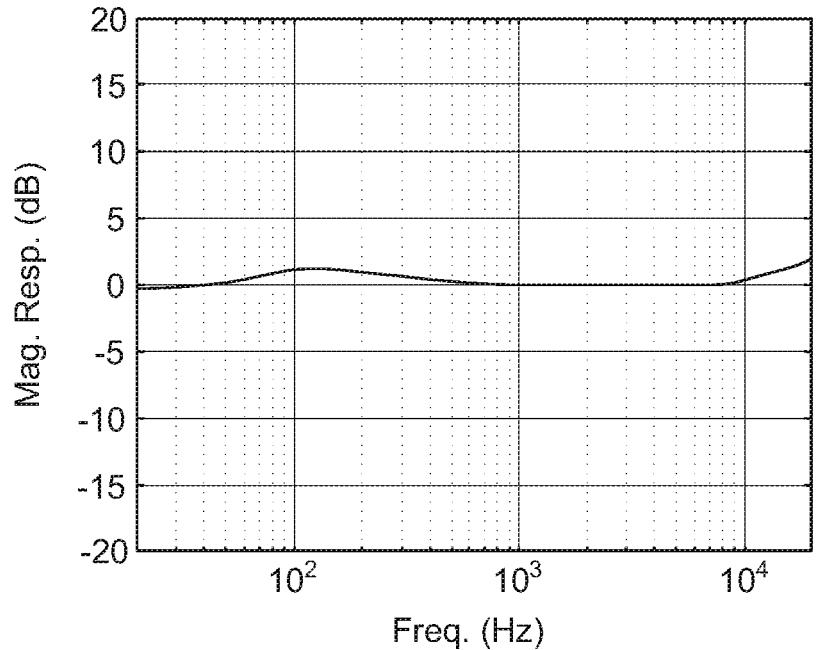
FIG. 11A illustrates a graph showing results of a loudness based filter that compensates between a reference and a 75 db contour, according to some embodiments.
Figure 11B:
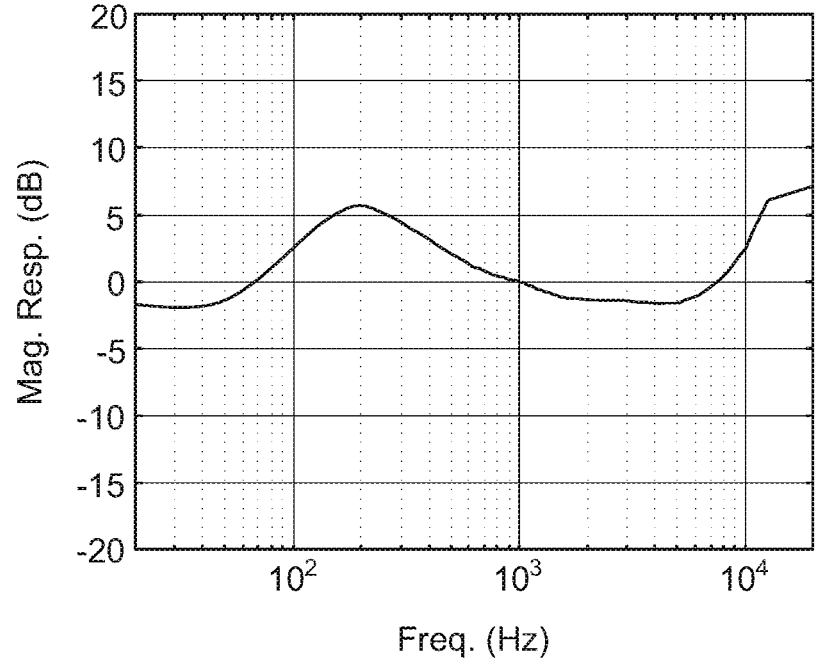
FIG. 11B illustrates a graph showing results of a loudness based filter that compensates between a reference and a 40 db contour, according to some embodiments.

FIG. 11A illustrates a graph 1100 showing results of a loudness based filter that compensates between a reference and a 75 db contour, and FIG. 11B illustrates graph 1110 showing results of the loudness based filter that compensates between a reference and a 40 db contour, according to some embodiments. In some embodiments, the graph 1100 is a result of yet another example processing 835 (FIG. 8, ML/AI adaptive shelf-cut (custom to TV/soundbar)). In one or more embodiments, the processing 835 uses an adaptive shelf-cut filter using ML/AI. The processing 835 adjusts the output for cutoff frequency (fc), quality factor (Q) and gain (G) dynamically if a user changes volume setting from 75 dBC to 40 dBC. The input is the volume setting, and the output is fc/Q/G. In some alternate example embodiments, processing 835 creates bass curves at various playback levels and interpolates using ML/AI with the input as volume setting, and the output are the loudness based filters in graphs 1100 and 1110 (e.g., Fast Fourier Transform (FFT)/Magnitude domain and derived minimum-phase model). Specifically, a frequency sampling based FIR filter in the time-domain can be first designed to match the target magnitude response of the loudness compensation curve. Then the linear-phase filter is converted to a minimum-phase filter using real-cepstrum processing.

Figure 12:
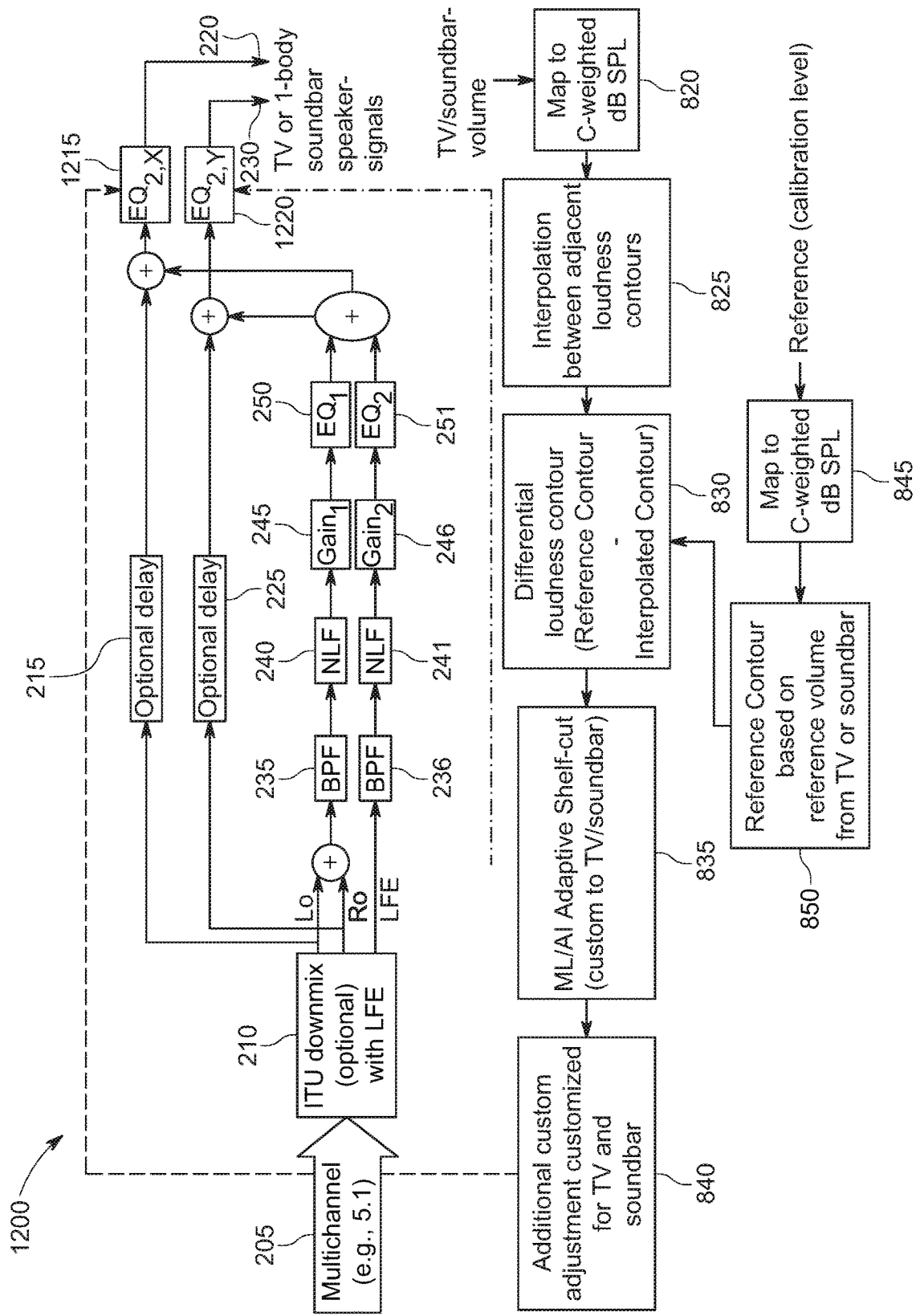
FIG. 12 illustrates another high-level processing system diagram for dynamic adjustment based on system gain, according to some embodiments.

FIG. 12 illustrates another high-level processing system diagram 1200 for dynamic adjustment based on system gain, according to some embodiments. In some embodiments, the processing system diagram 1200 includes multichannel (e.g., 5.1, etc.) source 205, an ITU downmix (optional) with LFE 210, optional delay function 215, $EQ_{2X}$ 1215, optional delay function 225, $EQ_{2Y}$ 1220, BPF 235, NLF 240, Gain' function 801, $EQ_1$ 251, BPF 236, NLF 241, $Gain_2$ function 802, $EQ_2$ 252, processing 820 (map to C-weighted dB SPL), processing 825 (interpolation between adjacent loudness contours), processing 830 (differential loudness contour (reference contour—interpolated contour)), processing 835 (ML/AI adaptive shelf-cut filter (custom to TV/soundbar), processing 840 (additional custom adjustment customized for TV and soundbar), processing 845 (map C-weighted dB SPL) and processing 850 (reference contour based on reference volume from TV or soundbar (e.g., lookup table)). The TV/soundbar volume is input to the processing 820 and the reference (calibration level) is input to the processing 845.

Figure 13:
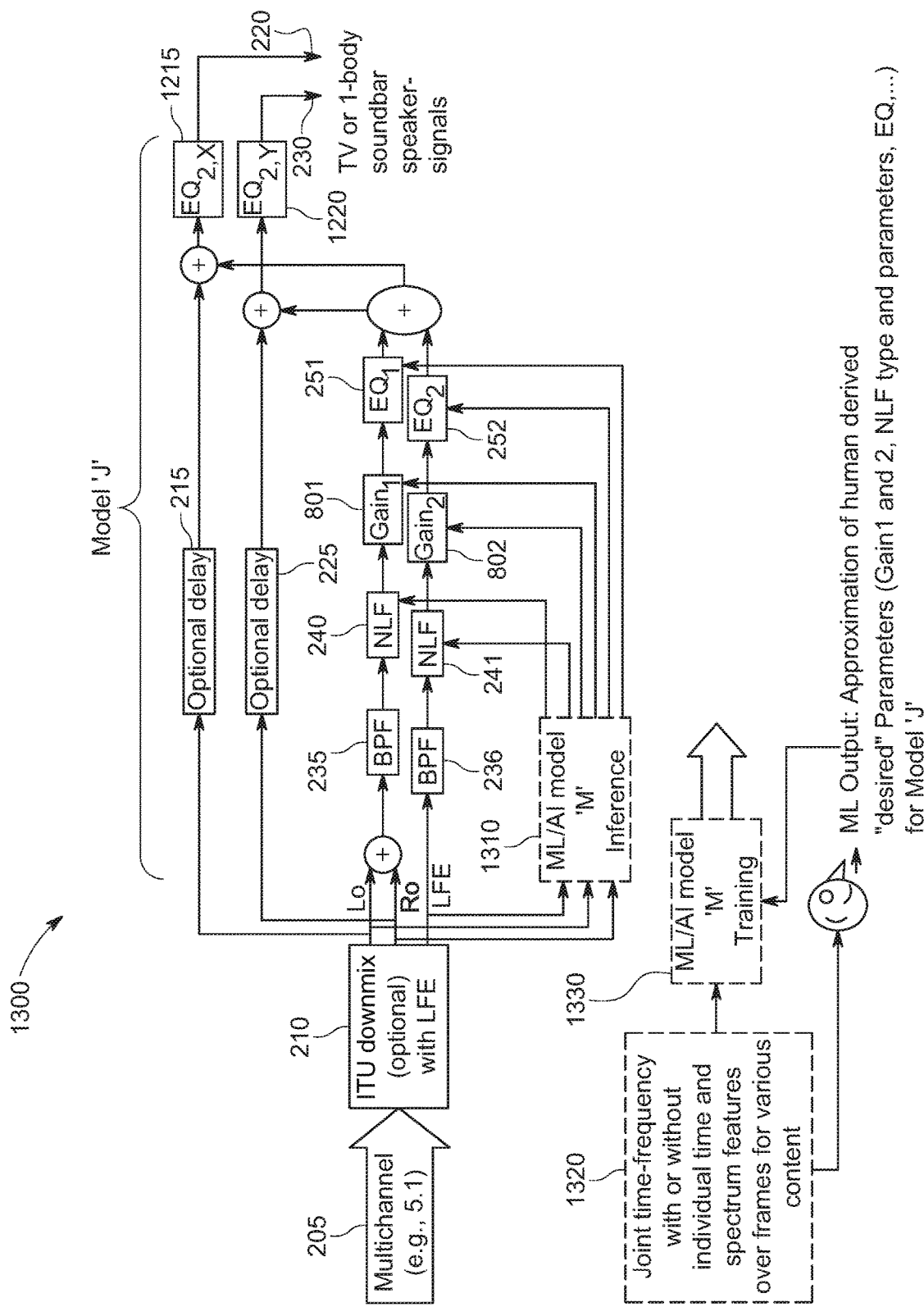
FIG. 13 illustrates yet another high-level processing system diagram for machine-learning (ML) based parameter adjustments, according to some embodiments.

FIG. 13 illustrates yet another high-level processing system diagram 1300 for ML based parameter adjustments, according to some embodiments. In some embodiments, the processing system diagram 1300 includes multichannel (e.g., 5.1, etc.) source 205, an ITU downmix (optional) with LFE 210, optional delay function 215, $EQ_{2X}$ 1215, optional delay function 225, $EQ_{2Y}$ 1220, BPF 235, NLF 240, Gain' function 801, $EQ_1$ 251, BPF 236, NLF 241, $Gain_2$ function 802, $EQ_2$ 252, processing 1310 for ML/AI model 'M' inference, processing 1320 for joint time-frequency with or without individual time and spectrum features over frames for various content and processing 1330 for ML/AI model 'M' training. The ML output is an approximation of human derived "desired" parameters ($Gain_1$, $Gain_2$, NLF type and parameters, EQ, etc.) for Model 'J.' In some embodiments, first various audio test content (tracks) are processed by the bass-enhancing system and listened to by a human listener pool, where the various tunable parameters are adjusted to individually maximize the performance of various test tracks in terms of bass performance relative to a reference full-range loudspeaker system playback. The ML model is trained by analyzing the input features of the same audio tracks on a per frame basis to output a best-approximation of the tuned parameters at the output of the ML model. This ML model is then used to perform inference on arbitrary audio content.

Figure 14:
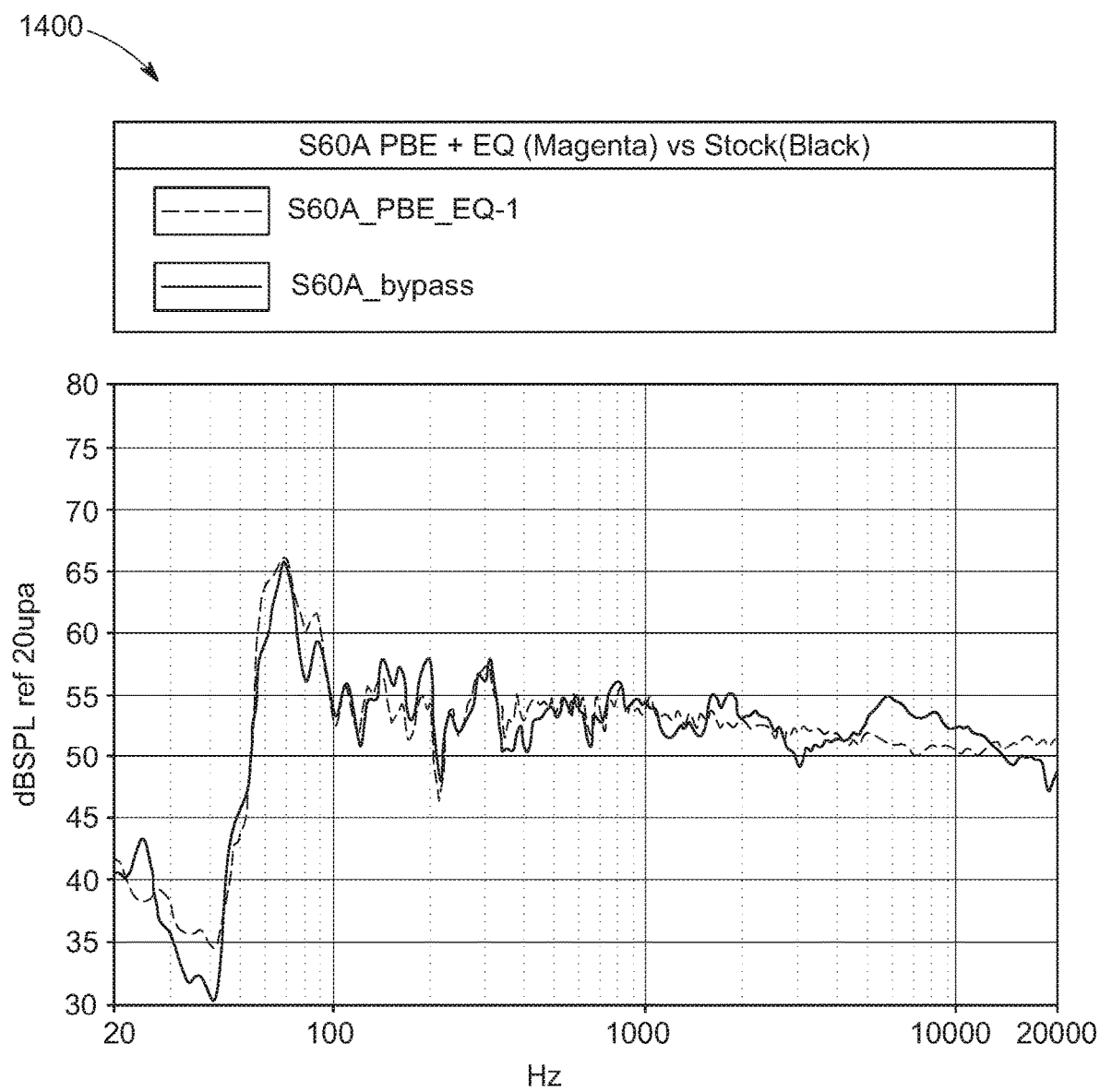
FIG. 14 illustrates a graph showing results of an example on/off spectra soundbar (acoustic domain), according to some embodiments.

FIG. 14 illustrates a graph 1400 showing results of an example on/off spectra soundbar (acoustic domain), according to some embodiments. Graph 1400 shows the acoustic response of the soundbar with pink noise stimulus both with room correction+PBE and stock. A correlated L/R signal and uncorrelated LFE signal fed a model element that defines a mathematical relationship between its input and output for real-time playback in both cases (e.g., Simulink model).

Figure 15:
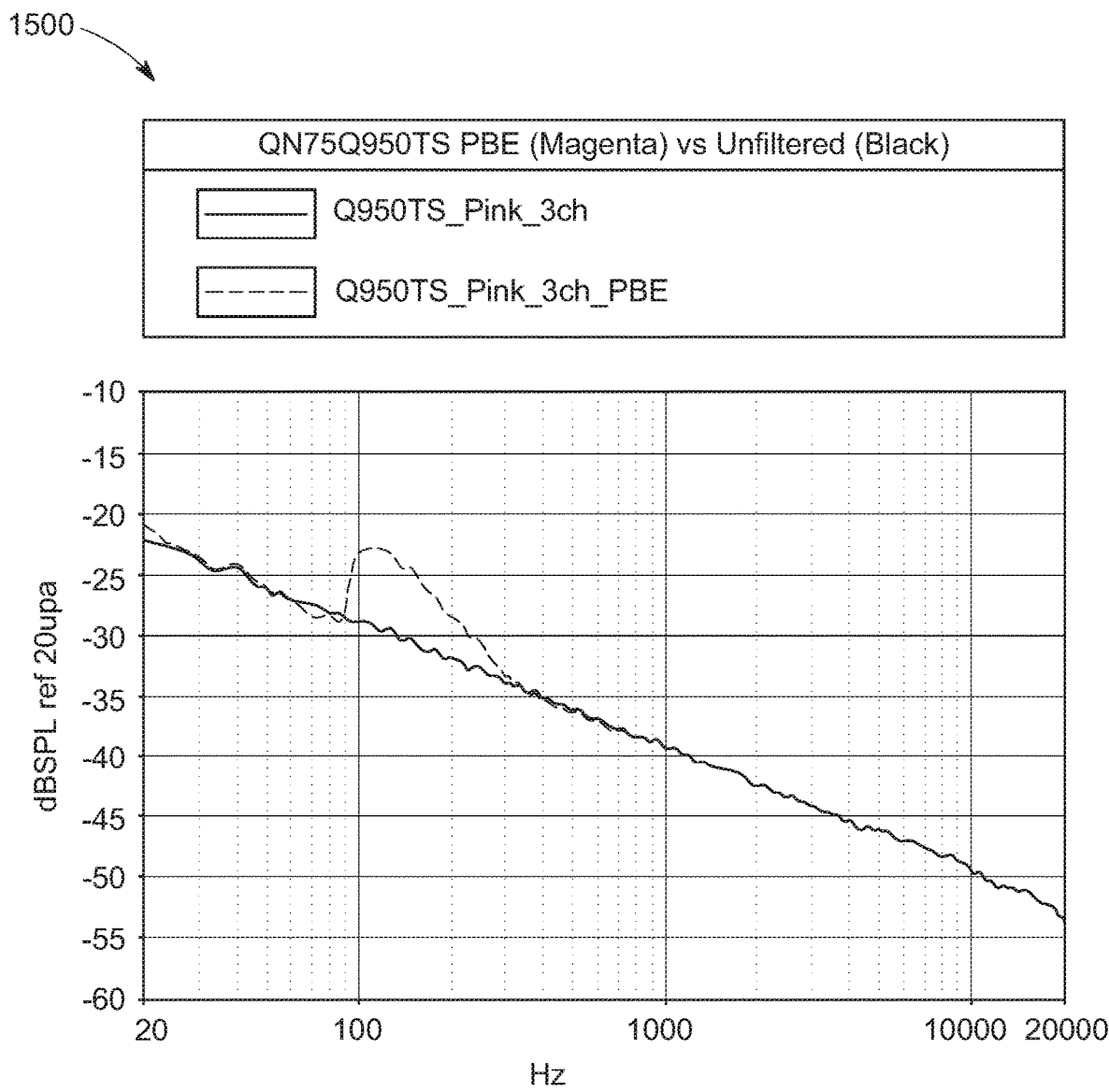
FIG. 15 illustrates a graph showing results of an example on/off spectra TV (electrical domain), according to some embodiments.

FIG. 15 illustrates a graph 1500 showing results of an example on/off spectra TV (electrical domain), according to some embodiments. Graph 1500 shows the input response to an example TV with PBE and unprocessed with a pink noise source. A correlated L/R signal and uncorrelated LFE signal fed a model element that defines a mathematical relationship between its input and output for real-time playback in both cases (e.g., Simulink model).

Some embodiments may be used for (but are not limited to) any consumer application that has limited bass extension (e.g., TV/soundbars, automotive loudspeakers, portable loudspeakers, compact home-theater speakers, smartphone/laptop/tablet speakers, etc.).

One or more embodiments are applicable to enhance sound quality of movies. One example category of movie content that has a strong use of one or more embodiments is action movies. Together the engine noise, gunshot sound, and explosion sounds have lots of energy in the low frequency (impact/rumble, <100 Hz) but defining details at higher frequencies (whirring, snap/crackle >100 Hz). Nearly all of the speech included is above 100 Hz and is unaffected by PBE. Orchestra/background music->100 Hz is unaffected. In one example, if one listens to the original signal low-passed at 100 Hz, this is the original track downmixed to stereo. The sounds of engine noise, impact of gunshot sound, and explosion sounds that are present in a signal are enhanced by PBE. With the one or more embodiments applied, one should hear more of these sounds including where the fundamental is not present (i.e., below the cutoff of the speaker). If one listens to the original signal high-passed at 100 Hz, the music and dialogue are primarily live here, and the signal will not be processed by PBE and has no harmonics generated.

Some embodiments are applicable to enhance sound quality of music. One example category of music content that has a strong use of one or more embodiments is pop, electronic, or rhythm and blues (R&B) music. For a bass drum (e.g., ROLAND® TR-808) the low tones of the bass/kick drum may be centered around 45-55 Hz. With pop music, typically bass synthesizers and drums are mixed to the LFE channel when mixed to 5.1 or higher. In one or more embodiments, on tracks with a bass drum, example singing at ~120 Hz and higher is unaffected. For keyboard playing harmony, the lower synthesized notes of a keyboard may be impacted by processing of some embodiments, but not others. In an example track, where the original signal is low-passed at 100 Hz (e.g., for an original track downmixed to stereo), when the only sound heard that is strong is the kick drum the signal that will be enhanced by PBE. In one example track where the original signal high-passed at 100 Hz and all the singing and instrumentation is present, processing of some embodiments provide that the signal is not processed by PBE and will remain unchanged.

One or more embodiments are applicable to enhance sound quality of acoustic recordings. For effectiveness of PBE, the source content should have significant content within the range at which PBE is being applied. For an example of a soundbar, this range may be 30-80 Hz.

Figure 16:
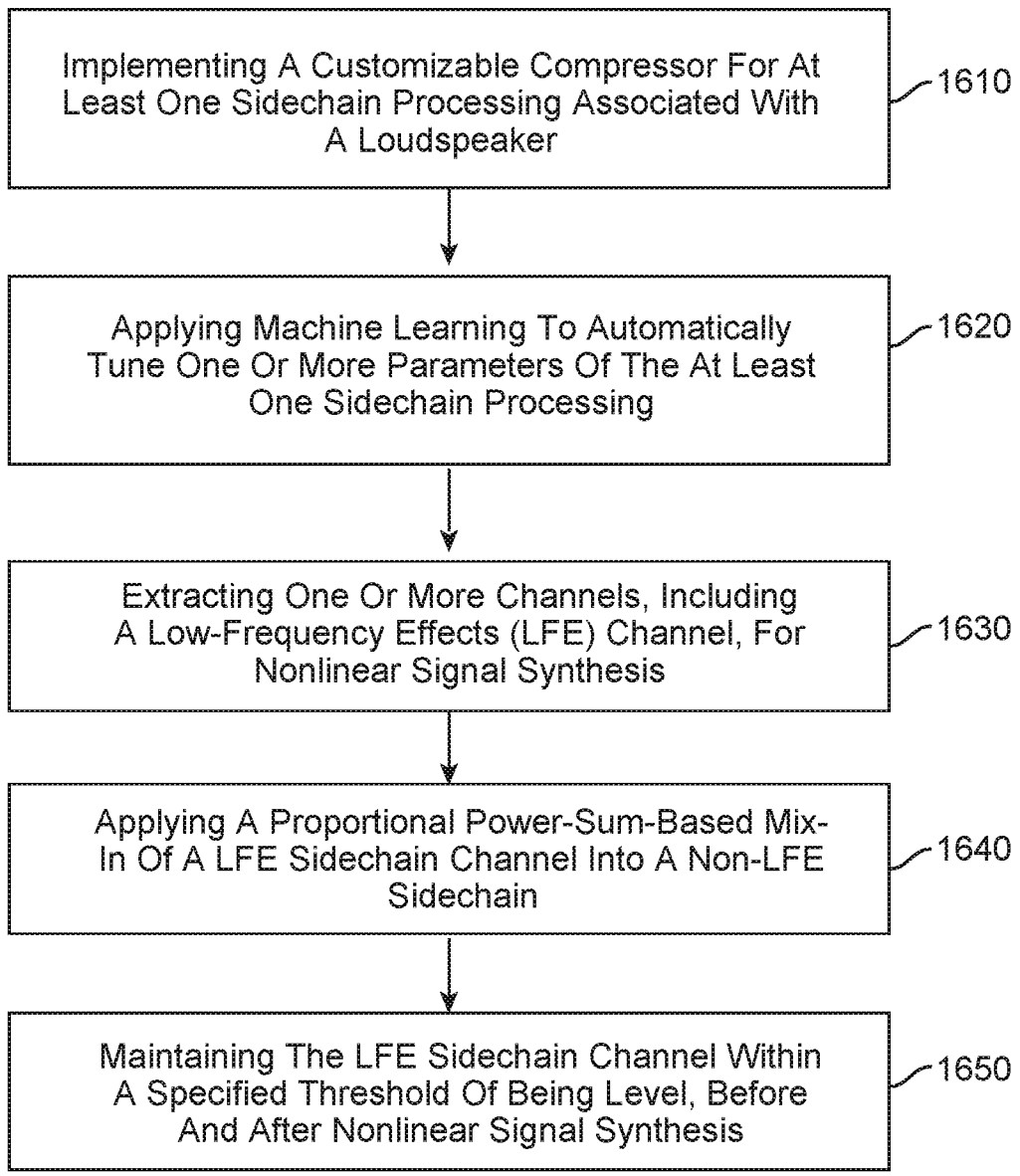
FIG. 16 illustrates a process for bass extension for a loudspeaker for improving sound quality, according to some embodiments.

FIG. 16 illustrates a process 1600 for bass extension for a loudspeaker for improving sound quality, according to some embodiments. In block 1610, process 1600 implements a customizable compressor (e.g., compressor 508, FIG. 5B, compressor 620, FIG. 6) for at least one sidechain processing (e.g., L+R sidechain 512, LFE sidechain 513, FIG. 5B, etc.) associated with a loudspeaker. In block 1620, process 1600 applying ML (processing 835, FIG. 8, 12, processing 1310, FIG. 13, etc.) to automatically tune one or more parameters (e.g., Gain, NLF type and parameters, EQ, etc.) of the at least one sidechain processing. In block 1630, process 1600 extracts one or more channels (e.g., L, R, Center, Ls, Rs, etc.), including a LFE channel, for nonlinear signal synthesis. In block 1640, process 1600 applies a proportional power-sum-based mix-in of an LFE sidechain channel into a non-LFE sidechain. In block 1650, process 1600 maintains the LFE sidechain channel within a specified threshold of being level, before and after nonlinear signal synthesis.

In some embodiments, process 1600 further provides dynamically equalizing at least one of harmonic signals or main channel signals based on playback gain and loudness contour.

In one or more embodiments, process 1600 further provides the feature that the one or more channels include one or more of independent channels including a left channel, a right channel, a center channel, a left surround channel and a right surround channel.

In some embodiments, process 1600 additionally provides the feature that dynamically equalizing includes interpolation processing with linear or AI processing.

In one or more embodiments, process 1600 further provides the feature that the applying ML to automatically tune one or more parameters of the at least one sidechain processing includes AI processing for automatic tuning of sidechain non-linear signal synthesis parameters based on one or more types of signals.

In some embodiments, process 1600 additionally provides the feature that the customizable compressor is implemented in the LFE sidechain channel for the loudspeaker, and another customizable compressor is implemented in a left and right sidechain channel for the loudspeaker.

In one or more embodiments, process 1600 further provides modifying gain in the LFE sidechain channel based on frame-by-frame basis by comparing before the non-linear synthesis and after the non-linear synthesis and any gain or equalization processing, and smoothing a resulting gain using a filter.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented bass extension method comprising:
    implementing a customizable compressor for at least one sidechain processing associated with a loudspeaker;
    applying machine learning to automatically tune one or more parameters of the at least one sidechain processing;
    extracting one or more channels, including a low-frequency effects (LFE) channel, for nonlinear signal synthesis;
    applying a LFE-root mean square (RMS) proportional summation, using an LFE function for a LFE sidechain channel, into is one or more non-LFE sidechain channels; and
    maintaining the LFE sidechain channel within a specified threshold of being level, before and after nonlinear signal synthesis.

2. The computer-implemented bass extension method of claim 1, further comprising:
    dynamically equalizing at least one of harmonic signals or main channel signals based on playback gain and loudness contour.

3. The computer-implemented bass extension method of claim 1, wherein the one or more channels include one or more of independent channels comprising a left channel, a right channel, a center channel, a left surround channel and a right surround channel.

4. The computer-implemented bass extension method of claim 1, wherein the dynamically equalizing comprises interpolation processing with linear or artificial intelligence (AI) processing.

5. The computer-implemented bass extension method of claim 4, wherein the applying machine learning to automatically tune one or more parameters of the at least one sidechain processing comprises AI processing for automatic tuning of sidechain non-linear signal synthesis parameters based on one or more types of signals.

6. The computer-implemented bass extension method of claim 1, wherein the customizable compressor is implemented in the LFE sidechain channel for the loudspeaker, and another customizable compressor is implemented in a left and right sidechain channel for the loudspeaker.

7. The computer-implemented bass extension method of claim 1, further comprising:

modifying gain in the LFE sidechain channel based on frame-by-frame basis by comparing before the non-linear synthesis and after the non-linear synthesis and any gain or equalization processing, and smoothing a resulting gain using a filter.

8. A non-transitory processor-readable medium that includes a program that when executed by a processor performs bass extension for a loudspeaker, comprising:
implementing, by the processor, a customizable compressor for at least one sidechain processing associated with the loudspeaker;
applying, by the processor, machine learning to automatically tune one or more parameters of the at least one sidechain processing;
extracting, by the processor, one or more channels, including a low-frequency effects (LFE) channel, for nonlinear signal synthesis;
applying, by the processor, a LFE-root mean square (RMS) proportional summation, using an LFE function for a LFE sidechain channel, into non-LFE sidechain channels; and
maintaining, by the processor, the LFE sidechain channel within a specified threshold of being level, before and after nonlinear signal synthesis.

9. The non-transitory processor-readable medium of claim 8, further comprising:
dynamically equalizing, by the processor, at least one of harmonic signals or main channel signals based on playback gain and loudness contour.

10. The non-transitory processor-readable medium of claim 8, wherein the one or more channels include one or more of independent channels comprising a left channel, a right channel, a center channel, a left surround channel and a right surround channel.

11. The non-transitory processor-readable medium of claim 8, wherein the dynamically equalizing comprises interpolation processing with linear or artificial intelligence (AI) processing.

12. The non-transitory processor-readable medium of claim 11, wherein the applying machine learning to automatically tune one or more parameters of the at least one sidechain processing comprises AI processing for automatic tuning of sidechain non-linear signal synthesis parameters based on one or more types of signals.

13. The non-transitory processor-readable medium of claim 8, wherein the customizable compressor is implemented in the LFE sidechain channel for the loudspeaker, and another customizable compressor is implemented in a left and right sidechain channel for the loudspeaker.

14. The non-transitory processor-readable medium of claim 8, further comprising:
modifying gain in the LFE sidechain channel based on frame-by-frame basis by comparing before the non-linear synthesis and after the non-linear synthesis and any gain or equalization processing, and smoothing a resulting gain using a filter.

15. An apparatus comprising:
a memory storing instructions; and
at least one processor executes the instructions including a process configured to:
implement a customizable compressor for at least one sidechain processing associated with a loudspeaker;
apply machine learning to automatically tune one or more parameters of the at least one sidechain processing;
extract one or more channels, including a low-frequency effects (LFE) channel, for nonlinear signal synthesis;
apply a LFE-root mean square (RMS) proportional summation, using an LFE function for a LFE sidechain channel, into non-LFE sidechain channels; and
maintain the LFE sidechain channel within a specified threshold of being level, before and after nonlinear signal synthesis.

16. The apparatus of claim 15, wherein the process further configured to:
dynamically equalize at least one of harmonic signals or main channel signals based on playback gain and loudness contour.

17. The apparatus of claim 15, wherein the one or more channels include one or more of independent channels comprising a left channel, a right channel, a center channel, a left surround channel and a right surround channel.

18. The apparatus of claim 15, wherein dynamically equalizing comprises interpolation processing with linear or artificial intelligence (AI) processing, and the applying machine learning to automatically tune one or more parameters of the at least one sidechain processing comprises AI processing for automatic tuning of sidechain non-linear signal synthesis parameters based on one or more types of signals.

19. The apparatus of claim 15, wherein the customizable compressor is implemented in the LFE sidechain channel for the loudspeaker, and another customizable compressor is implemented in a left and right sidechain channel for the loudspeaker.

20. The apparatus of claim 15, wherein the process is further configured to:
modify gain in the LFE sidechain channel based on frame-by-frame basis by comparing before the non-linear synthesis and after the non-linear synthesis and any gain or equalization processing, and smoothing a resulting gain using a filter.

* * * * *